US012573612B2

(12) United States Patent
Rikita et al.

(10) Patent No.: US 12,573,612 B2
(45) Date of Patent: Mar. 10, 2026

(54) NEGATIVE ELECTRODE MATERIAL, BATTERY, METHOD FOR PRODUCING NEGATIVE ELECTRODE MATERIAL, AND METHOD FOR PRODUCING BATTERY

(71) Applicant: MITSUBISHI MATERIALS CORPORATION, Tokyo (JP)

(72) Inventors: Naoki Rikita, Tokyo (JP); Yoshinobu Nakada, Saitama (JP); Jie Tang, Ibaraki (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 692 days.

(21) Appl. No.: 17/916,657

(22) PCT Filed: Feb. 22, 2021

(86) PCT No.: PCT/JP2021/006567
§ 371 (c)(1),
(2) Date: Oct. 3, 2022

(87) PCT Pub. No.: WO2021/205765
PCT Pub. Date: Oct. 14, 2021

(65) Prior Publication Data
US 2023/0155110 A1 May 18, 2023

(30) Foreign Application Priority Data

Apr. 10, 2020 (JP) ................................. 2020-071106

(51) Int. Cl.
*H01M 4/36* (2006.01)
*H01M 4/02* (2006.01)
(Continued)

(52) U.S. Cl.
CPC .......... *H01M 4/364* (2013.01); *H01M 4/366* (2013.01); *H01M 4/386* (2013.01); *H01M 4/485* (2013.01);
(Continued)

(58) Field of Classification Search
None
See application file for complete search history.

(56) References Cited

U.S. PATENT DOCUMENTS 10,411,265 B2 9/2019 Takeda et al.
11,264,604 B2* 3/2022 Matsuhara ............ H01M 4/587
(Continued)

FOREIGN PATENT DOCUMENTS

CN 102500360 A 6/2012
CN 102674903 A 9/2012
(Continued)

OTHER PUBLICATIONS

H.-s. Kim et al., "Novel silicon-tungsten oxide-carbon composite as advanced negative electrode for lithium-ion batteries," Solid State Ionics 314, 2018, pp. 41-45. (cited in the Oct. 18, 2024 Search Report issued for EP21785409.0) (Year: 2018).*
(Continued)

*Primary Examiner* — Kevin M Bernatz
(74) *Attorney, Agent, or Firm* — Troutman Pepper Locke LLP

(57) ABSTRACT

A negative electrode material is a negative electrode material for a battery, and the material includes carbon, tungsten trioxide formed on the surface of the carbon, and silicon formed on the surface of the carbon.

9 Claims, 36 Drawing Sheets

(51) Int. Cl.

| | |
|---|---|
| *H01M 4/38* | (2006.01) |
| *H01M 4/485* | (2010.01) |
| *H01M 4/583* | (2010.01) |
| *H01M 10/0525* | (2010.01) |

(52) U.S. Cl.

CPC ....... *H01M 4/583* (2013.01); *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 2010/0075227 A1* | 3/2010 | Morita | H01M 4/62 |
| | | | 252/182.1 |
| 2014/0234710 A1 | 8/2014 | Lee et al. | |
| 2016/0336622 A1* | 11/2016 | Zhang | H01M 10/36 |
| 2018/0019500 A1 | 1/2018 | Miura | |
| 2018/0076462 A1* | 3/2018 | Takeda | H01M 4/62 |
| 2019/0181423 A1 | 6/2019 | Takada et al. | |
| 2019/0267618 A1 | 8/2019 | Kanetake et al. | |
| 2024/0113289 A1* | 4/2024 | Nakada | H01M 4/133 |

FOREIGN PATENT DOCUMENTS

| | | |
|---|---|---|
| CN | 103008015 A | 4/2013 |
| CN | 107251304 A | 10/2017 |
| CN | 107834102 A | 3/2018 |
| CN | 110783561 A | 2/2020 |
| JP | 2004-146350 A | 5/2004 |
| JP | 2008-016446 A | 1/2008 |
| JP | 2010-073651 A | 4/2010 |
| JP | 2011-076822 A | 4/2011 |
| JP | 2014-143032 A | 8/2014 |
| JP | 2015-069864 A | 4/2015 |
| JP | 2018-045904 A | 3/2018 |
| JP | 2018-142402 A | 9/2018 |
| JP | 2019-075324 A | 5/2019 |
| JP | 2019-149348 A | 9/2019 |
| KR | 10-2014-0104066 A | 8/2014 |
| KR | 2018-0082006 A | 7/2018 |
| WO | 2014/115322 A1 | 7/2014 |
| WO | 2018/030176 A1 | 2/2018 |

OTHER PUBLICATIONS

H.-s. Kim et al., "Novel silicon-tungsten oxide-carbon composite as advanced negative electrode for lithium-ion batteries," Solid State Ionics 314, 2018, pp. 41-45. (cited in the Oct. 18, 2024 Search Report issued for EP21785409.0).

Supplementary European Search Report dated Oct. 18, 2024, issued for EP21785409.0.

Official Action dated Aug. 22, 2024, issued for the TW110112473.

Office Action mailed Jun. 10, 2023, issued in the corresponding Chinese patent application No. 202180025309.4 and an English machine translation thereof.

Office Action mailed on Aug. 5, 2025, issued for KR10-2022-7034511 and an English machine translation thereof.

\* cited by examiner

EXAMPLE 1: HC-Si-WO$_3$-1

EXAMPLE 1: HC-Si-WO$_3$-1

A3

(WO$_3$+Si) OBTAINED AT FIRST STEP (Si: 5% BY WEIGHT)

(WO$_3$+Si) OBTAINED AT FIRST STEP (Si: 5% BY WEIGHT)

EXAMPLE 1: HC-Si-WO$_3$-1

EXAMPLE 2: HC-Si-WO$_3$-2

A30

EXAMPLE 2: HC-Si-WO$_3$-2

A31

A32

EXAMPLE 2: HC-Si-WO₃-2

COMPARATIVE EXAMPLE 1: HC-Si

COMPARATIVE EXAMPLE 1: HC-Si

COMPARATIVE EXAMPLE 2: GRAPHITE-WO$_3$

COMPARATIVE EXAMPLE 2: GRAPHITE-WO₃

EXAMPLE 1: HC-Si-WO$_3$-1

EXAMPLE 2: HC-Si-WO$_3$-2

Rate performance

Rate performance

Rate performance

EXAMPLE 4: HC-Si-WO$_3$-1 (Si: 8% BY WEIGHT)

Rate performance

COMPARATIVE EXAMPLE 3: HC

Cycling performance

Cycling performance

COMPARATIVE EXAMPLE 2:
HC-WO$_3$ (5% BY WEIGHT)

Cycling performance

Charge/discharge curve of
HC-Si-WO$_3$ (two-step) at 0.2C

Charge/discharge curve of
HC-Si-WO$_3$ (one-step) at 0.2C 214 mAh/g

Charge/discharge curve of
HC-Si (6 wt%)

Charge/discharge curve of
HC-WO$_3$ at 0.2C

Charge/discharge curve of
HC-Si-WO$_3$ (two-step) at 3.2C

Charge/discharge curve of
HC-Si-WO$_3$ (one-step) at 3.2C

Charge/discharge curve of
HC-Si at 3.2C

Charge/discharge curve of
HC-WO$_3$(5wt%) at 3.2C

Charge/discharge curve of
HC at 3.2C 103 mAh/g

NEGATIVE ELECTRODE MATERIAL, BATTERY, METHOD FOR PRODUCING NEGATIVE ELECTRODE MATERIAL, AND METHOD FOR PRODUCING BATTERY

FIELD

The present invention relates to a negative electrode material, a battery, a method for producing a negative electrode material, and a method for producing a battery.

BACKGROUND

Carbon is sometimes used as a negative electrode material of a lithium ion battery. For example, Patent Literature 1 describes a negative electrode in which tungsten trioxide is arranged on a surface of graphite. Arranging tungsten trioxide on the surface of graphite can improve diffusion of a lithium ion, which can improve a battery performance such as a capacity.

CITATION LIST

Patent Literature

Patent Literature 1: Japanese Patent Application Laid-open No. 2018-45904

SUMMARY

Technical Problem

However, in the negative electrode material as described above, there still is a room for improvement in performance.

The present invention has been made in view of the above, and an object of the present invention is to provide a negative electrode material having an improved performance, a battery, a method for producing a negative electrode material, and a method for producing a battery.

Solution to Problem

To solve the problem above, a negative electrode material for a battery of the present disclosure comprises: carbon; tungsten trioxide formed on a surface of the carbon; and silicon formed on the surface of the carbon.

In the negative electrode, it is preferable that the carbon, the tungsten trioxide, and the silicon are composited.

In the negative electrode, it is preferable that the carbon is composited with the tungsten trioxide, and the carbon is composited with the silicon.

In the negative electrode, it is preferable that the carbon is an amorphous carbon or a graphite.

In the negative electrode, it is preferable that the negative electrode material comprises the tungsten trioxide having a hexagonal crystal structure.

In the negative electrode, it is preferable that the negative electrode material comprises the tungsten trioxide having a hexagonal crystal structure and an orthorhombic crystal structure.

In the negative electrode, it is preferable that a ratio of an addition amount of the silicon to a total amount including an addition amount of the carbon, an addition amount of the tungsten trioxide, and an addition amount of the silicon is in a range of 1% or more by weight to 10% or less by weight.

In the negative electrode, it is preferable that based on 100% by weight as a total content of the carbon, the tungsten trioxide, and the silicon, a content of the silicon is in a range of 1% or more by weight to 10% or less by weight.

In the negative electrode, it is preferable that based on 100% by weight as a total content of the carbon, the tungsten trioxide, and the silicon, a ratio of a content of the silicon to a content of the tungsten trioxide is in a range of 0.2 or more to 2.5 or less.

To solve the problem above, a battery of the present disclosure comprises: the negative electrode material according to any one of claims 1 to 9; and a positive electrode material.

To solve the problem above, a method for producing a negative electrode material for a battery of the present disclosure comprises: a step of adding tungsten trioxide to a solution for dissolution to dissolve the tungsten trioxide; a step of dissolving silicon in the solution for dissolution in which the tungsten trioxide is dissolved; a step of removing a liquid component in the solution for dissolution in which the tungsten trioxide and the silicon are dissolved to produce a primary intermediate; a step of dissolving the primary intermediate and carbon in a liquid; and a step of removing a liquid component in the liquid in which the primary intermediate and the carbon are dissolved to produce the negative electrode material.

To solve the problem above, a method for producing a negative electrode material for a battery of the present disclosure comprises: a step of adding tungsten trioxide to a solution for dissolution to dissolve the tungsten trioxide; a step of dissolving silicon and carbon in the solution for dissolution in which the tungsten trioxide is dissolved; and a step of removing a liquid component in the solution for dissolution in which the tungsten trioxide, the silicon, and the carbon are dissolved to produce the negative electrode material.

In the method for producing a negative electrode material, it is preferable that a ratio of an addition amount of the silicon to a total amount including an addition amount of the carbon, an addition amount of the tungsten trioxide, and an addition amount of the silicon is in a range of 1% or more by weight to 10% or less by weight.

In the method for producing a negative electrode material, it is preferable that an alkaline solution is used as the solution for dissolution.

To solve the problem above, a method for producing a battery of the present disclosure comprises: the method for producing a negative electrode material; and a step of producing a positive electrode material.

Advantageous Effects of Invention

According to the present invention, a performance of the negative electrode material can be improved.

DESCRIPTION OF EMBODIMENTS

Figure 1:
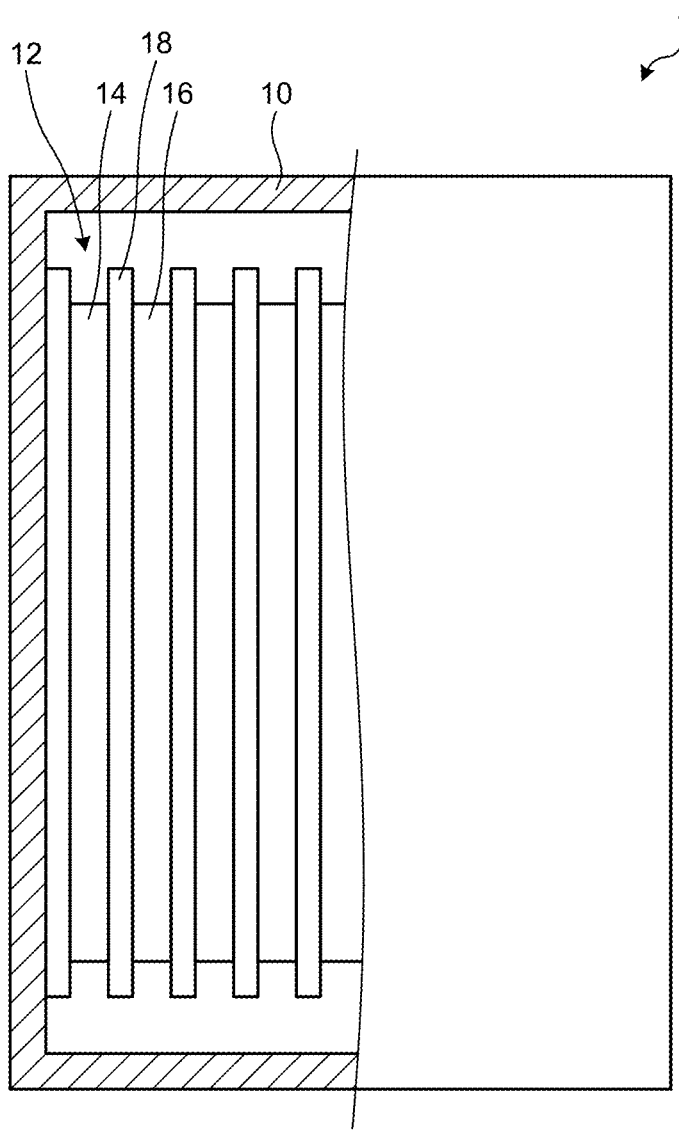
FIG. 1 is a schematic partial cross-sectional view of a battery according to an embodiment.

Hereinafter, an embodiment of the present invention will be described in detail with referring to the drawings. Note that the present invention is not limited by the following embodiments (hereinafter referred to as "embodiments"). In addition, the composition elements in the following embodiments include those that can be readily conceived by a person ordinarily skilled in the art, those that are substantially identical, and those that are in the so-called equivalent range. Furthermore, the composition elements disclosed in the following embodiments may be combined as appropriate.

(Battery)

FIG. 1 is a schematic partial cross-sectional view of a battery according to this embodiment. A battery 1 in this embodiment is a lithium ion secondary battery. The battery 1 is equipped with a casing 10, a group of electrodes 12, and an electrolyte liquid which is not described. The casing 10 is the casing that accommodates the electrode group 12 and the electrolyte liquid therein. In addition to the electrode group 12, the casing 10 may be equipped with wirings and terminals that are connected to the electrode group 12.

The electrode group 12 has a negative electrode 14, a positive electrode 16, and a separator 18. The electrode group 12 consists of the separator 18 between the negative electrode 14 and the positive electrode 16. In the example of FIG. 1, the electrode group 12 has a so-called stacked electrode group structure in which the rectangular negative electrode 14 and the rectangular positive electrode 16 are alternately stacked with the rectangular separator 18 between them. However, the electrode group 12 is not limited to those having the stacked electrode group structure. For example, the electrode group 12 may be of a rolled electrode group structure in which a strip of the negative electrode 14 and a strip of the positive electrode 16 are stacked with a strip of the separator 18 between them, these being rolled up together.

(Negative Electrode)

Figure 2:
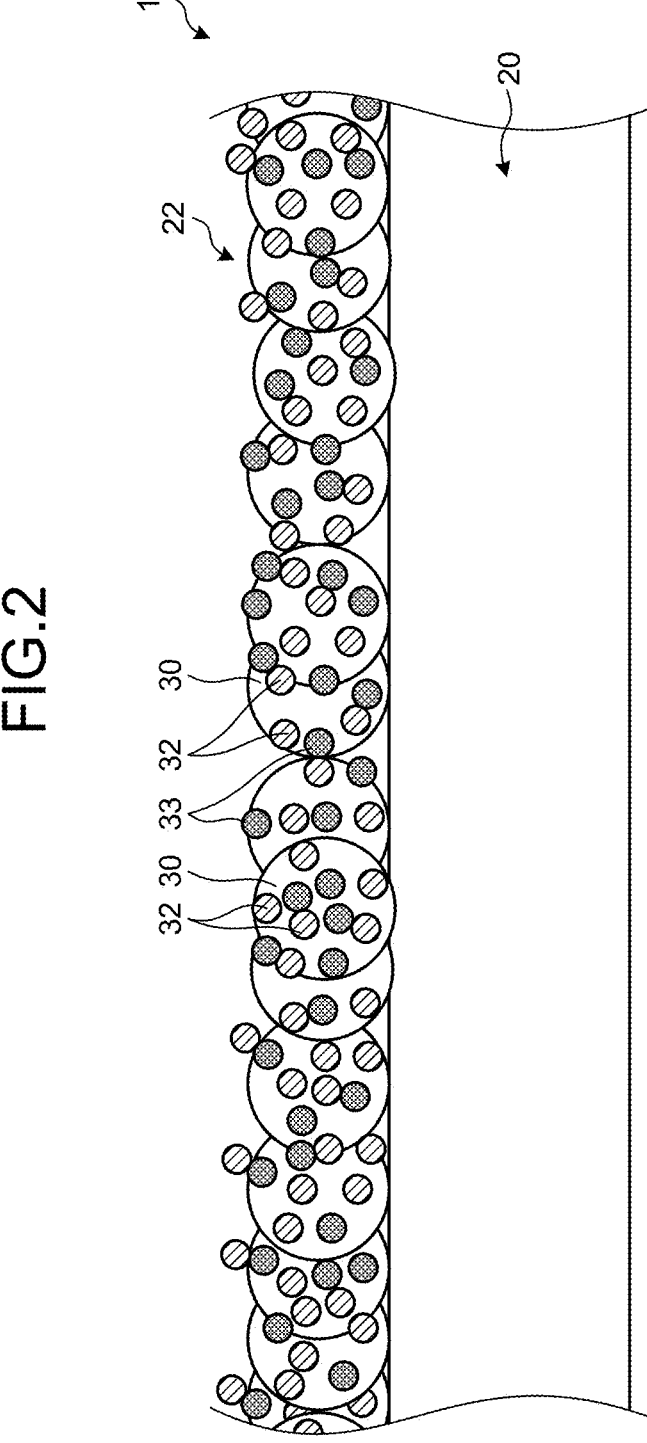
FIG. 2 is a schematic cross-sectional view of an example of a negative electrode according to the embodiment.

FIG. 2 is a schematic cross-sectional view of an example of the negative electrode according to this embodiment. As can be seen in FIG. 2, the negative electrode 14 has a current collector layer 20 and a negative electrode material layer 22. The current collector layer 20 is a layer that is composed of a conductive member. The conductive member in the current collector layer 20 may be, for example, copper. The negative electrode material layer 22 is the layer containing the negative electrode material according to this embodiment. The negative electrode material layer 22 is formed on the surface of the current collector layer 20. The thickness of the current collector layer 20 may be, for example, in the range of about 15 μm or more to about 40 μm or less, and the thickness of the negative electrode material layer 22 may be, for example, in the range of about 20 μm or more to about 200 μm or less.

The negative electrode material layer 22 includes a negative electrode material. The negative electrode material includes carbon, tungsten trioxide formed on the surface of the carbon, and silicon formed on the surface of the carbon. More specifically, the negative electrode material of the negative electrode material layer 22 includes a carbon particle 30, which is the particle of the carbon, a $WO_3$ (tungsten trioxide) particle 32, which is the particle of the tungsten trioxide, and a silicon particle 33, which is the particle of the silicon. The shapes of the particles here are not limited to sphere or the like, but can be any shape, including linear and sheet-like shapes.

The tungsten trioxide on the surface of the carbon includes at least one of the following: the tungsten trioxide directly adhered to the carbon and the tungsten trioxide indirectly adhered to the carbon via the silicon that is adhered to the carbon. The negative electrode material in this embodiment preferably includes at least the carbon and the silicon that is adhered with the tungsten trioxide.

The negative electrode material of the negative electrode material layer 22 includes a plurality of the carbon particles 30. The carbon particle 30 include an amorphous carbon or a graphite.

The amorphous carbon is the amorphous carbon not having a crystalline structure. The amorphous carbon, sometimes called a formless carbon or a diamond-like carbon, can also be said as the carbon having a mixture of sp2 and sp3 bonds. The carbon particle of the amorphous carbon is preferably composed entirely of the amorphous carbon and contains no components other than the amorphous carbon except for unavoidable impurities. Specifically, the carbon particle of the amorphous carbon is preferably free of a graphite.

The graphite is the carbon having a planar crystal structure.

The carbon particles 30 preferably have an average particle diameter in the range of 1 μm or more to 50 μm or less, while more preferably in the range of 1 μm or more to 20 μm or less. When the average particle diameter is within this range, the strength of the electrode film can be retained.

The negative electrode material in the negative electrode material layer 22 further includes a plurality of the $WO_3$ particles 32 and a plurality of the silicon particles 33. More specifically, for each carbon particle 30, a plurality of the $WO_3$ particles 32 and a plurality of the silicon particles 33 are formed. Of the plurality of the $WO_3$ particles 32, one $WO_3$ particle 32 is formed on the surface of the carbon particle 30. Of the plurality of the $WO_3$ particles 32, the other $WO_3$ particle 32 is formed on the surface of the silicon particle 33. More specifically, the silicon particle 33 is adhered to (in contact with) the surface of the carbon particle 30, and the $WO_3$ particle 32 is adhered to (in contact with) the surface of the silicon particle 33. The carbon particle 30, the $WO_3$ particle 32, and the silicon particle 33 may be composited.

Alternatively, the carbon particle 30 and the silicon particles 33 may be composited, and the carbon particle 30 and the $WO_3$ particle 32 may be composited. Accordingly, the negative electrode material of the negative electrode material layer 22 is composed of the composite of the carbon particle 30, the $WO_3$ particle 32, and the silicon particle 33; but also this may further include at least one of the composition that the carbon particle 30 and the silicon particle 33 are composited and the composition that the carbon particle 30 and the $WO_3$ particle 32 are composited.

The composite here refers to the state in which it is no longer possible to release, at least in the absence of an external force, the silicon particle 33 from the carbon particle 30, the silicon particle 33 from the $WO_3$ particle 32, and the $WO_3$ particle 32 from the carbon particle 30. For example, the external force refers to the force generated when the SET (Solid Electrolyte Interphase) film is formed over the entire surface layer and expands and contracts upon operating the battery that uses the negative electrode material.

For example, the composition includes at least one of the following: formation of the composite in which the silicon particle 33 is arranged on the surface of the carbon particle 30 and the $WO_3$ particle 32 is arranged on the surface of the silicon particle 33, formation of the composite in which the $WO_3$ particle 32 is arranged on the surface of the carbon particle 30 and the silicon particle 33 is arranged on the surface of the $WO_3$ particle 32, formation of the composite in which the silicon particle 33 is arranged on the surface of the carbon particle 30, formation of the composite in which the $WO_3$ particle 32 is arranged on the surface of the carbon particle 30, and formation of the composite in which the $WO_3$ particle 32 is arranged on the surface of the silicon particle 33.

The $WO_3$ particle 32 includes the particle having a hexagonal crystal structure. In other words, the negative electrode material includes the tungsten trioxide having the hexagonal crystal structure, and may also include an orthorhombic (rectangular) crystal structure and tungsten silicide as long as the content of the hexagonal tungsten trioxide is the largest. Also, only the hexagonal tungsten trioxide may be included. However, the negative electrode material does not include a tetragonal crystal structure. The negative electrode material may also include an amorphous tungsten trioxide.

The average particle diameter of the $WO_3$ particles 32 is smaller than that of the carbon particles 30. The average particle diameter of the $WO_3$ particles 32 is preferably in the range of 100 nm or more to 20 μm or less, while more preferably in the range of 100 nm or more to 1 μm or less.

As described above, the negative electrode material has a structure in which the particulate tungsten trioxide ($WO_3$ particle 32) and the silicon (silicon particle 33) are formed on the surface of the carbon particle 30, but the negative electrode material structure is not limited to this structure. The negative electrode material may be any as long as this has the structure in which the tungsten trioxide and the silicon are formed on the surface of the carbon, and thus, the shapes of the tungsten trioxide and of the silicon formed on the surface of the carbon may be arbitrary. In this embodiment, the tungsten trioxide was used as the tungsten compound and the tungsten oxide. Also, in this embodiment, the silicon was used, but a silicon compound or a silicon oxide may be used as well.

The negative electrode material layer 22 may include a substance other than the negative electrode materials (the carbon particle 30, the $WO_3$ particle 32, and the silicon particle 33). The negative electrode material layer 22 may include, for example, a binder. A binder material may be any, and illustrative examples thereof include polyvinylidene fluoride (PVDF), carboxymethyl cellulose (CMC), styrene-butadiene rubber (SBR), and polyacrylic acid (PAA). One type of the binder may be used solely, or two or more types may be used in combination. However, when the carbon particle 30 is the amorphous carbon, it is preferable that the negative electrode material layer 22, in other words, the negative electrode material, does not include the graphite.

The carbon, the tungsten trioxide, and the silicon can be identified by an X-ray diffraction method. For example, if the peak waveform in the X-ray diffraction analysis result of the analyte exhibits the peak waveform of carbon, but the (002) peak waveform in the known graphite structure is broad, this can be judged as the amorphous carbon. Also, for example, if the position (angle) of the peak in the X-ray diffraction analysis result of the analyte matches the position of the peak in the known tungsten trioxide, the analyte can be judged to include the tungsten trioxide. Further, for example, if the position (angle) of the peak in the X-ray diffraction analysis result of the analyte matches the position of the peak in the known silicon, the analyte can be judged to include the silicon.

That the $WO_3$ particle 32 and the silicon particle 33 are arranged on the surface of the carbon particle 30 can be confirmed by observation with an electron microscope such as SEM (Scanning Electron Microscope) or TEM (Transmission Electron Microscope).

Furthermore, the elemental ratios of the carbon, the tungsten trioxide, and the silicon in the negative electrode material in this embodiment can be measured with an emission spectrometry.

TABLE 1

| Sample | Elemental composition (% by weight) | | |
| --- | --- | --- | --- |
| | Si | $WO_3$ | C |
| HC—Si—$WO_3$ (Si: 2% by weight) | 1.86 | 4.06 | 94.08 |
| HC—Si—$WO_3$ (Si: 5% by weight) | 4.39 | 3.99 | 91.62 |
| HC—Si—$WO_3$ (Si: 8% by weight) | 6.82 | 4.10 | 89.08 |

Table 1 illustrates, as an example, the results of the elemental ratios measured by the emission spectrometry method and so forth for the negative electrode material of Example 1 to be described later. Specifically, for the negative electrode material in Example 1, the chemical components of silicon, tungsten, and oxygen were measured, with the remainder being considered to be carbon. The silicon and the tungsten were measured by a CP-OES method (Inductivity Coupled Plasma Optical Emission Spectrometer) (manufacturer: "Agilent", instrument name: "720-ES"), and the oxygen was measured by an inert gas fusion-infrared absorption method (manufacturer: "LECO", instrument name: "ONH836"). On the basis of 100% by weight as the total of the three elements, i.e., the silicon, the tungsten trioxide, and the carbon, in the product negative electrode material, the content of the silicon is preferably in the range of 1% or more by weight to 10% or less by weight, more preferably in the range of 1% or more by weight to 8% or less by weight, or 2% or more by weight to 8% or less by weight, while even more preferably in the range of 1.5% or more by weight to 7% or less by weight, or 1.8% or more by weight to 7% or less by weight. On the basis of 100% by weight as the total of the three elements, i.e., the silicon, the tungsten trioxide, and the carbon, in the product negative electrode material, the content of the tungsten trioxide is preferably in the range of 1% or more by weight to 10% or less by weight, more preferably in the range of 2% or more by weight to 8% or less by weight, while even more preferably in the range of 3% or more by weight to 5% or less by weight.

From the measurement results in Table 1, the ratios of the silicon content (% by weight) to the tungsten trioxide content (% by weight) in the negative electrode material of Example 1 each were as follows. The ratio in the sample (2% by weight of Si) was 0.46, the ratio of the sample (5% by weight of Si) was 1.10, and the ratio of the sample (8% by weight of Si) was 1.66. On the basis of 100% by weight as the total of the three elements, i.e., the silicon, the tungsten trioxide, and the carbon, in the product negative electrode material, the ratio of the silicon content (% by weight) to the tungsten trioxide content (% by weight) is preferably in the range of 0.2 or more to 2.5 or less, more preferably in the range of 0.2 or more to 2.0 or less, or 0.5 or more to 2.0 or less, while even more preferably in the range of 0.3 or more to 1.8 or less, or 0.4 or more to 1.7 or less.

(Variant of Negative Electrode)

Figure 3:
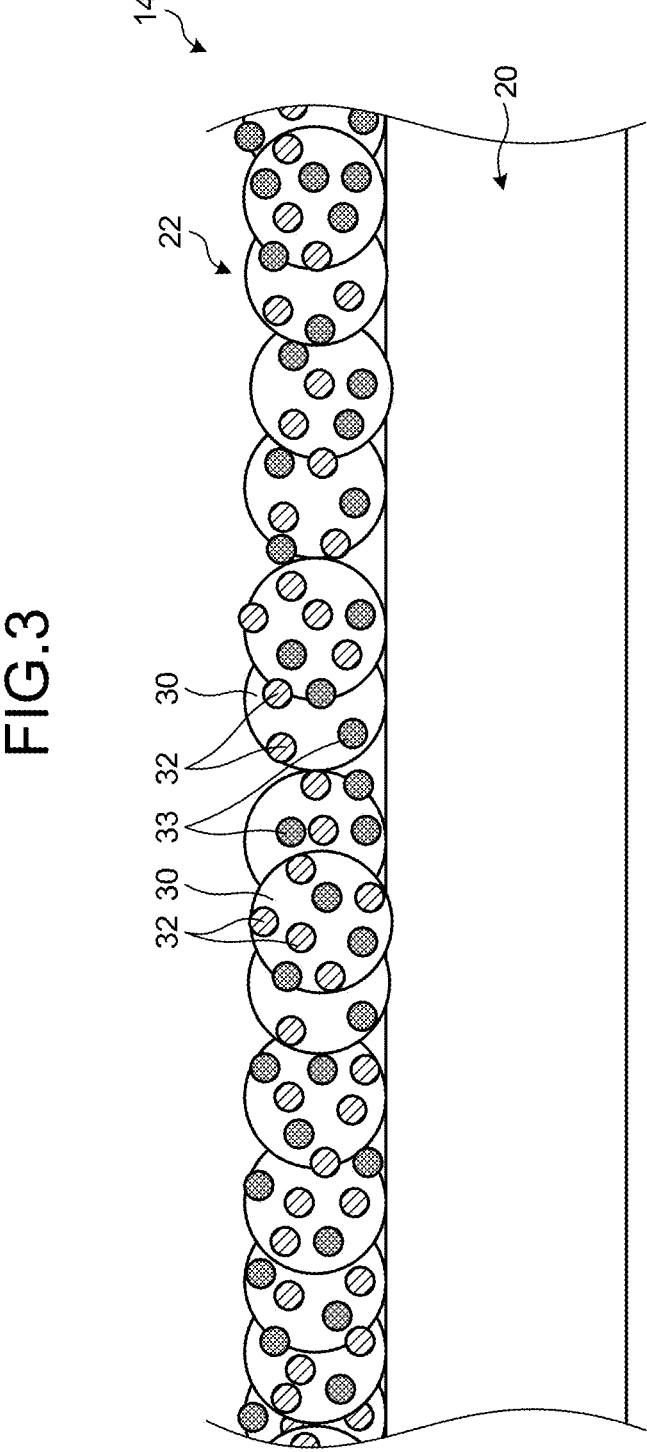
FIG. 3 is a schematic cross-sectional view of another example of the negative electrode according to the embodiment.

FIG. 3 is a schematic cross-sectional view of another example of the negative electrode according to this embodiment. The negative electrode material in the negative electrode material layer 22 may have the silicon particle 33 adhered to (in contact with) the surface of the carbon particle 30 and the $WO_3$ particle 32 adhered to (in contact with) the surface of the carbon particle 30. In this case, the carbon particle 30 and the silicon particle 33 may form a composite, and the carbon particle 30 and the $WO_3$ particle 32 may form a composite.

The $WO_3$ particle 32 includes the hexagonal crystal structure and the orthorhombic crystal structure. That is, the negative electrode material includes at least one of the tungsten trioxide having the hexagonal crystal structure and the tungsten trioxide having the orthorhombic crystal structure. However, the crystal structure of the tungsten trioxide included in the negative electrode material is not limited to this, and may include, for example, the tungsten trioxide having other crystal structures.

Accordingly, the negative electrode material has the structure in which the particulate tungsten trioxide ($WO_3$ particle 32) and the silicon particle 33 are formed on the surface of the carbon particle 30, but the structure of the negative electrode material is not limited to this. The negative electrode material may be any as long as this has the structure in which the tungsten trioxide and the silicon are formed on the surface of the carbon, and thus, the shapes of the tungsten trioxide and of the silicon formed on the surface of the carbon may be arbitrary.

(Positive Electrode)

The positive electrode 16 has a current collector layer and a positive electrode material layer. The current collector layer of the positive electrode 16 is a layer composed of a conductive member, where the conductive member is, for example, aluminum. The positive electrode material layer is a layer of a positive electrode material, and is formed on the surface of the current collector layer of the positive electrode 16. The thickness of the current collector layer of the positive electrode may be, for example, in the range of about 10 μm or more to about 30 μm or less, and the thickness of the positive electrode material layer may be, for example, in the range of about 10 μm or more to about 100 μm or less.

The positive electrode material layer includes the positive electrode material. The positive electrode material includes a particle of a lithium compound, which is a lithium-containing compound. The lithium compound may be a lithium-containing metal oxide or a lithium-containing phosphate salt. More specifically, illustrative examples of the lithium compound include $LiCoO_2$, $LiNiO_2$, $LiMnO_2$, $LiMn_2O_4$, $LiNi_aCo_bMn_cO_2$ ($0<a<1$, $0<b<1$, $0<c<1$, $a+b+c=1$), and $LiFePO_4$. The lithium compound may include only one type of the material, or two or more types of the material. The positive electrode material layer may also include a substance other than the positive electrode material; for example, this may include a binder. The binder material may be any, and illustrative example thereof include polyvinylidene fluoride (PVDF), polytetrafluoroethylene (PTFE), and PAA. One type of the binder may be used solely, or two or more types may be used in combination. (Separator)

The separator 18 is an insulating member. In this embodiment, the separator 18 is a porous membrane made of a resin such as polyethylene (PE) or polypropylene (PP). The separator 18 may be constructed by a laminated layer of membranes of different materials. The separator 18 may also have a heat-resistant layer. The heat-resistant layer is a layer containing a substance having a high melting point. The heat-resistant layer may include a particle of an inorganic material such as alumina. (Electrolyte Liquid)

The electrolyte liquid formed in the battery 1 is a non-aqueous electrolyte liquid. The electrolyte liquid is impregnated into a space in the electrode group 12. The electrolyte liquid includes, for example, a lithium salt and an aprotic solvent. The lithium salt is dispersed and dissolved in the aprotic solvent. Illustrative examples of the lithium salt include $LiPF_6$, $LiBF_4$, $Li[N(FSO_2)_2]$, $Li[N(CF_3SO_2)_2]$, $Li[B(C_2O_4)_2]$, and $LiPO_2F_2$. The aprotic solvent may be, for example, a mixture of a cyclic carbonate ester with a linear carbonate ester. Illustrative examples of the cyclic carbonate ester include EC, PC, and butylene carbonate. Illustrative examples of the linear carbonate ester include dimethyl carbonate (DMC), ethyl methyl carbonate (EMC), and diethyl carbonate (DEC). (Method for Producing Battery)

Figure 4:
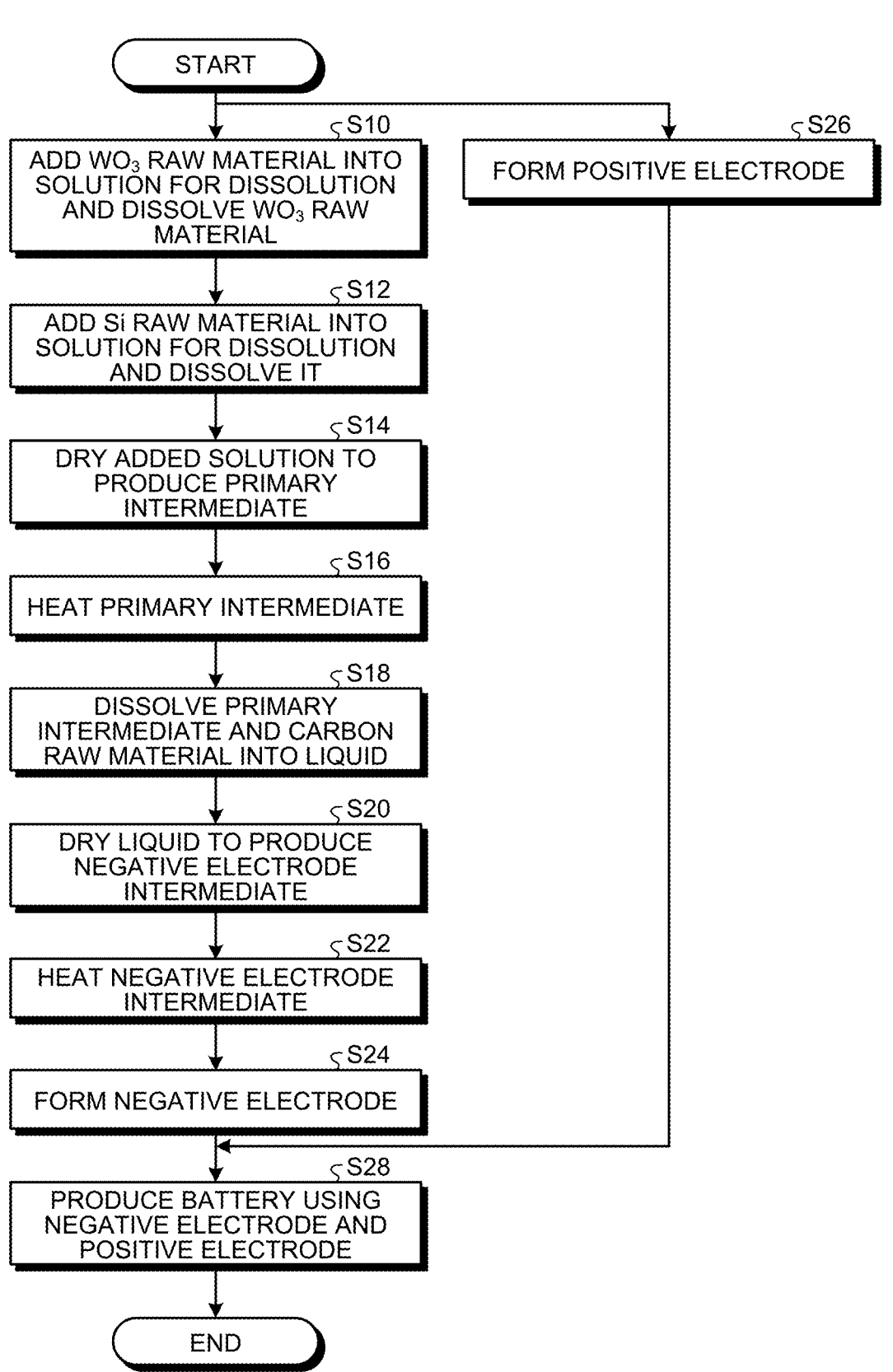
FIG. 4 is a flowchart illustrating an example of a method for producing a battery according to the embodiment.

Next, an example of the method for producing the battery 1 according to this embodiment will be described. FIG. 4 is a flowchart illustrating an example of the method for producing the battery according to this embodiment. As can be seen in FIG. 4, in this production method, the negative electrode 14 is formed at Steps S10 through S28.

Specifically, the $WO_3$ raw material is added to the solution for dissolution, so that the $WO_3$ raw material is dissolved in the solution for dissolution (Step S10; dissolution step). The $WO_3$ raw material is the tungsten trioxide, which is used as the raw material for the negative electrode material. The solution for dissolution is a solution in which the $WO_3$ raw material, i.e., the tungsten trioxide, can be dissolved. The solution for dissolution is, for example, an alkaline solution; in this embodiment, an aqueous ammonia solution is used. In the solution for dissolution, a concentration of ammonia in the entire solution for dissolution is preferably in the range of 5% or more by weight to 30% or less by weight.

In this embodiment, dissolution is not limited to the state in which everything is dissolved, but also includes the state in which a portion remains. Dissolution also includes dissolution by mixing.

The $WO_3$ raw material is produced, for example, by causing $CaWO_4$ to react with hydrochloric acid, which is followed by dissolving it in ammonia and then calcining the crystallized ammonium paratungstate, but this may be produced by any method.

At Step S10, it is preferable that the ratio of the addition amount of the $WO_3$ raw material to the amount of ammonia contained in the solution for dissolution is in the range of 1% or more by mole to 10% or less by mole. By setting the ratio of the addition amount of the $WO_3$ raw material to 1% or more, the amount of the tungsten trioxide in the solution for dissolution can be made sufficient, and by setting the ratio of the addition amount of the $WO_3$ raw material to 10% or less, the amount of the tungsten trioxide remaining without being dissolved can be suppressed. At Step S10, the $WO_3$ raw material is added to the solution for dissolution, and the resulting mixture is stirred for a prescribed time to dissolve the $WO_3$ raw material. The prescribed time at this step is preferably in the range of 6 hours or longer to 24 hours or shorter. By setting the prescribed time to 6 hours or longer, the $WO_3$ raw material can be properly dissolved in the solution for dissolution, and by setting the prescribed time to 24 hours or shorter, the production time can be avoided to become too long. The process of Step S10 may also be used as a preparation process at which the solution for dissolution in which the $WO_3$ raw material is dissolved is prepared in advance before proceeding to Step S12 to be described below.

Next, the silicon raw material is added to and dissolved in the solution for dissolution in which the $WO_3$ raw material is dissolved (in this case, an ammonium tungstate solution) (Step S12; addition step). The silicon raw material is the silicon to be used as the raw material.

At Step S12, the solution for dissolution in which the $WO_3$ raw material is dissolved is stirred to disperse the silicon raw material in the solution for dissolution. At Step S12, a surfactant may be added to the solution for dissolution in which the silicon raw material and the $WO_3$ raw material are dispersed in order to enhance the affinity of the silicon raw material with $WO_3$. Sodium dodecylsulfate (SDS) may be used as the surfactant. The addition amount of the surfactant is preferably in the range of 2% or more by weight to 8% or less by weight, relative to the amount of the $WO_3$ raw material added to the solution for dissolution. This numerical range appropriately enhances the affinity of the silicon raw material with the $WO_3$.

Next, the liquid component in the solution for dissolution is removed to form a primary intermediate material (primary intermediate material formation step). In this embodiment, Steps S14 and S16 are carried out as the primary intermediate material formation steps. Specifically, the solution for dissolution is dried to produce a primary intermediate (Step S14; drying step). At step S14, the solution for dissolution is heated in an air at 80° C. for 12 hours to remove, i.e., evaporate the liquid component included in the solution for dissolution. The primary intermediate can be said to include the solid component that remains after the liquid component in the solution for dissolution has been removed.

Next, the dried primary intermediate is heated to produce the primary intermediate material (Step S16; heating step). By heating the primary intermediate, the primary intermediate material having the $WO_3$ particle 32 formed on the surface of the silicon particle 33 is produced. The temperature at which the primary intermediate is heated is preferably in the range of 500° C. or higher to 900° C. or lower. By setting the temperature at which the primary intermediate is heated in this range, the primary intermediate material can be properly formed. The time for heating the primary intermediate is preferably in the range of 1 hour or longer to 10 hours or shorter. By setting the heating time of the primary intermediate in this range, the primary intermediate material can be properly formed. The process of Steps S12 to S16 may be used as a preparation process to prepare the primary intermediate material (or primary intermediate) described above in advance before proceeding to Step S18 to be described below.

Next, the primary intermediate material and the carbon raw material (in this case hard carbon) are mixed and dispersed in a liquid (in this case water) (Step S18; addition step). The carbon raw material is the hard carbon to be used as the raw material.

The carbon raw material may be produced, for example, by an oil furnace method. In the oil furnace method, for example, a raw material oil is sprayed into a high-temperature atmosphere for pyrolysis and then quenched to produce a particulate carbon raw material. However, the carbon raw material production method is not limited to this, and the method may be arbitrary.

Upon addition of the $WO_3$ raw material, the silicon raw material, and the carbon raw material to the solution for dissolution, the ratio of the addition amount of the silicon raw material to the total amount including the addition amount of the $WO_3$ raw material, the addition amount of the silicon raw material, and the addition amount of the carbon raw material is defined as the silicon raw material addition ratio, and the ratio of the addition amount of the $WO_3$ raw material to the total amount is defined as the $WO_3$ raw material addition ratio. In this production method, the silicon raw material addition ratio is in the range of 1% or more by weight to 10% or less by weight, preferably in the range of 2% or more by weight to 8% or less by weight, while more preferably in the range of 5% or more by weight to 8% or less by weight. By setting the silicon raw material addition ratio in this range, it is possible to properly form the silicon particle 33 on the surface of the carbon particle 30, so that a high battery capacity as the negative electrode can be achieved. In this production method, the $WO_3$ raw material addition ratio is in the range of 1% or more by weight to 10% or less by weight, preferably in the range of 2% or more by weight to 8% or less by weight, while more preferably in the range of 5% or more by weight to 8% or less by weight. By setting the $WO_3$ raw material addition ratio in this range, it is possible to properly form the $WO_3$ particle 32 on the surface of the carbon particle 30, so that a high battery capacity as the negative electrode can be achieved.

At Step S18, the liquid (in this case water) is stirred to disperse the primary intermediate material and the carbon raw material in the liquid. At Step S18, a surfactant may be added to the liquid in order to enhance the affinity among the carbon raw material, the silicon, and the $WO_3$. Sodium dodecylsulfate (SDS) may be used as the surfactant. The addition amount of the surfactant is preferably in the range of 2% or more by weight to 8% or less by weight relative to the amount of the carbon raw material added to the liquid. This numerical range properly enhances the affinity among the carbon raw material, the silicon, and the $WO_3$.

Next, the liquid component in the liquid is removed to produce the negative electrode material (negative electrode material formation step). In this embodiment, Step S20 and Step S22 are carried out as the negative electrode material formation step. Specifically, the liquid is dried to produce a negative electrode intermediate (Step S20; drying step). At Step S20, the liquid is heated in an air at 80° C. for 12 hours to remove, i.e., evaporate the liquid component included in the liquid. The negative electrode intermediate can be said to include the solid component that remains after the liquid component in the liquid has been removed.

Next, the negative electrode material is formed by heating the negative electrode intermediate (Step S22; heating step). By heating the negative electrode intermediate, the negative electrode material is formed in which the $WO_3$ particle 32 and the silicon particle 33 are formed on the surface of the carbon particle 30. The temperature at which the negative electrode intermediate is heated is preferably in the range of 500° C. or higher to 900° C. or lower. By setting the temperature at which the negative electrode intermediate is heated in this range, the negative electrode material can be properly formed. The time for heating the negative electrode intermediate is preferably in the range of 1 hour or longer to 10 hours or shorter. By setting the heating time of the negative electrode intermediate in this range, the negative electrode material can be properly formed.

Next, the negative electrode material thus formed is used to form the negative electrode 14 (Step S24). Namely, the negative electrode material layer 22 including the negative electrode material is formed on the surface of the current collector layer 20 to form the negative electrode 14.

The positive electrode 16 is also formed in this production method (Step S26). At Step S26, the positive electrode material is formed in the same way as at Steps S10 to S24, except that a lithium compound raw material, which is the lithium compound, is used instead of the carbon raw material. Then, the positive electrode 16 is formed by forming the positive electrode material layer including the positive electrode material on the surface of the current collector layer for the positive electrode 16.

When the negative electrode 14 and the positive electrode 16 have been formed, the battery 1 is produced using the negative electrode 14 and the positive electrode 16 (Step S28). Specifically, the negative electrode 14, the separator 18, and the positive electrode 16 are stacked to form the electrode group 12; then, the electrode group 12 and the electrolyte liquid are accommodated in the casing 10 to produce the battery 1.

As illustrated in Steps S10 to S22 described above, in the embodiment, after the silicon is added to the solution for dissolution in which the tungsten trioxide is dissolved, the liquid component is removed to form the primary intermediate material; then, the primary intermediate material and the hard carbon are added to the liquid to produce the negative electrode material. This method for producing the negative electrode material is hereinafter referred to as the solution method as the case may be. The above producing method is also referred to as a first producing method.

(Variant of Method for Producing Battery)

Figure 5:
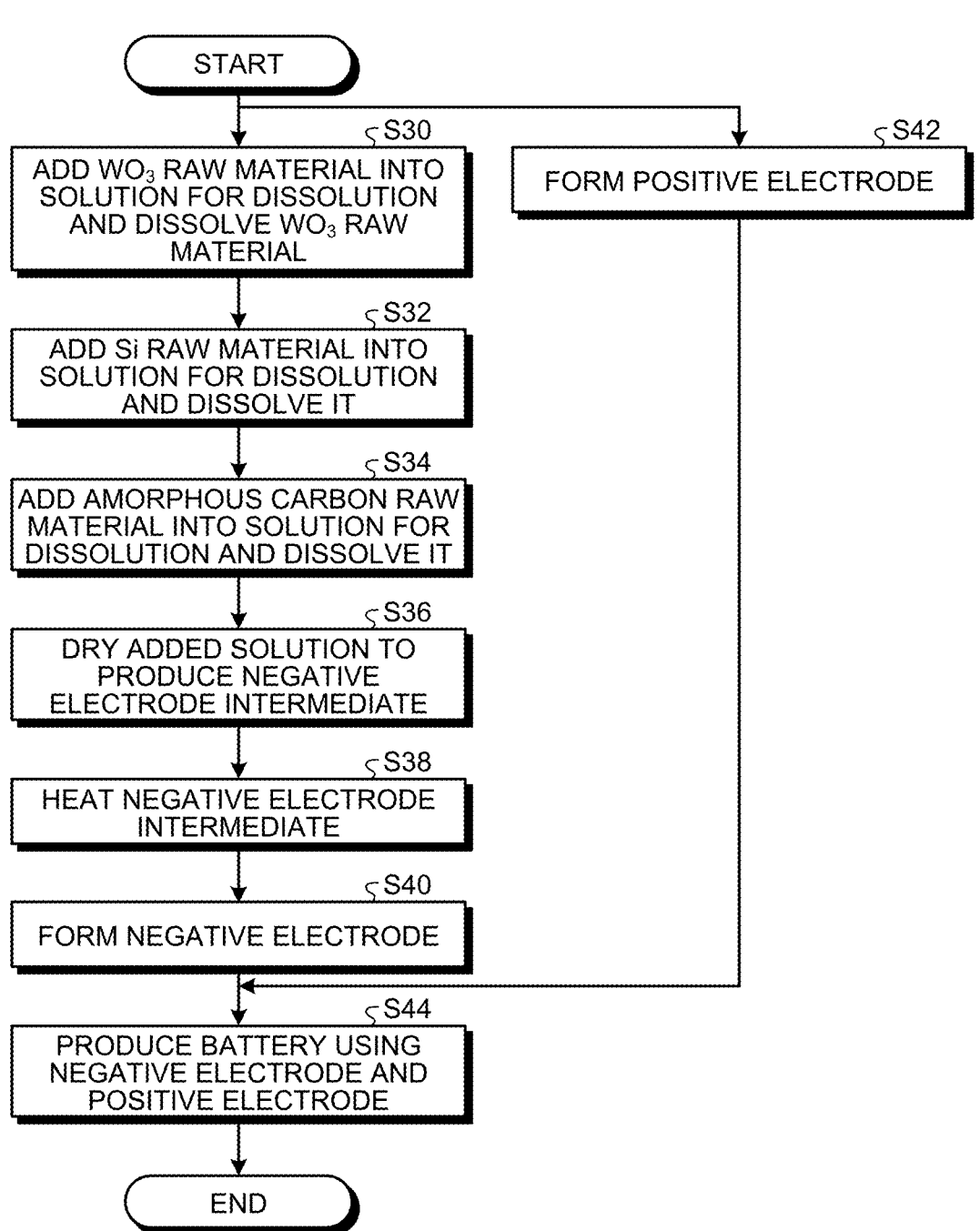
FIG. 5 is a flowchart illustrating another example of the method for producing the battery according to the embodiment.

Next, another example of the method for producing the battery 1 according to this embodiment will be described. FIG. 5 is a flowchart illustrating an example of the method for producing the battery according to this embodiment. As can be seen in FIG. 5, in this production method, the negative electrode 14 is formed at Steps S30 through S44. Steps S30, S32, S40, S42, and S44 are similar to Steps S10, S12, S24, S26, and S28, respectively.

Next, the carbon raw material is added to and dissolved in the solution for dissolution in which the $WO_3$ raw material and the silicon raw material are dissolved (Step S34; addition step). The carbon raw material is the hard carbon to be used as the raw material.

At step S34, the solution for dissolution is stirred to mix and disperse the $WO_3$ raw material, the silicon raw material, and the carbon raw material into the solution. At Step S34, a surfactant may be added to the liquid in order to enhance the affinity among the carbon raw material, the silicon, and the $WO_3$.

Next, the liquid component in the solution for dissolution is removed to form the negative electrode material (negative electrode material formation step). In this embodiment, Step S36 and Step S38 are carried out as the negative electrode material formation step. Specifically, the solution for dissolution is dried to produce the negative electrode intermediate (Step S36; drying step). At step S36, the solution for dissolution is heated in an air at 80° C. for 12 hours to remove, i.e., evaporate the liquid component included in the solution for dissolution. The negative electrode intermediate can be said to include the solid component that remains after the liquid component in the solution for dissolution has been removed.

Next, the negative electrode material is formed by heating the negative electrode intermediate (Step S38; heating step). By heating the negative electrode intermediate, the negative electrode material is formed in which the $WO_3$ particle 32 and the silicon particle 33 are formed on the surface of the carbon particle 30. The temperature at which the negative electrode intermediate is heated is preferably in the range of 500° C. or higher to 900° C. or lower. By setting the temperature at which the negative electrode intermediate is heated in this range, the negative electrode material can be properly formed. The time for heating the negative electrode intermediate is preferably in the range of 1 hour or longer to 10 hours or shorter. By setting the heating time of the negative electrode intermediate in this range, the negative electrode material can be properly formed.

Accordingly, in this embodiment, as illustrated in Steps S30 through S38, after the silicon and the hard carbon are added to the solution for dissolution in which the tungsten trioxide is dissolved, the liquid component is removed to produce the negative electrode material. The method of producing the negative electrode material is also hereinafter referred to as the solution method, as the case may be. The above producing method is also referred to as a second producing method.

As described above, the negative electrode material of the battery according to this embodiment includes the carbon, the tungsten trioxide formed on the surface of the carbon, and the silicon formed on the surface of the carbon. This negative electrode material can enhance the battery characteristics such as capacity by forming the tungsten trioxide and the silicon on the surface of the carbon.

Inclusion of the silicon in the battery's negative electrode material has been known to enhance the battery characteristics. In the negative electrode material, however, it has been known to be difficult for the silicon to be formed on the surface of the carbon. In this embodiment, by using the raw material containing the carbon, the tungsten trioxide, and the silicon, the negative electrode material including the silicon formed on the surface of the carbon can be produced by the solution method.

In the negative electrode material having the tungsten trioxide formed on the surface of the carbon, the tungsten trioxide needs to be properly arranged on the surface of the carbon. When the tungsten trioxide cannot be properly arranged on the surface of the carbon, i.e., when the tungsten trioxide is not formed on the surface of the carbon or when the tungsten trioxide is detached from the surface of the carbon, the battery characteristics will not be properly enhanced. On the other hand, the negative electrode material according to this embodiment uses the amorphous carbon as the carbon, and the tungsten trioxide is formed on the surface of the amorphous carbon. The amorphous carbon can contain a functional group (for example, a hydroxy group and a carboxyl group) on the surface thereof during the process of arranging the tungsten trioxide on the surface thereof. Therefore, this functional group makes it possible to properly trap the tungsten trioxide on the surface of the amorphous carbon and to properly arrange the tungsten trioxide on the surface thereof. The functional group also fixes the tungsten trioxide to the surface of the amorphous carbon, thereby increasing the adhesion of the tungsten trioxide to the surface of the amorphous carbon and preventing the tungsten trioxide from being detached from the surface of the carbon. Accordingly, the negative electrode material according to this embodiment can include the tungsten trioxide properly arranged on the surface of the carbon. Also, by using the negative electrode materials having the tungsten trioxide and the silicon formed on the surface of the hard carbon, as in this embodiment, the capacity can be enhanced, especially when charging and discharging a high current, so that the battery characteristics can be enhanced. In particular, the carbon raw material is produced at a lower temperature than, for example, graphite, so that the functional group is more likely to remain without being removed; thus, the tungsten trioxide and the silicon can be properly arranged on the surface thereof.

The negative electrode material according to this embodiment is preferably a composite of the carbon, the tungsten trioxide, and the silicon. In this embodiment, the tungsten trioxide and the silicon can be properly arranged on the surface of the carbon.

In the negative electrode material according to this embodiment, the carbon is preferably an amorphous carbon or graphite. According to this method, the tungsten trioxide and the silicon can be properly arranged on the surface of the amorphous carbon or graphite.

The negative electrode material according to this embodiment preferably includes the tungsten trioxide having the hexagonal crystal structure. By arranging the hexagonal tungsten trioxide on the surface of the hard carbon, the tungsten trioxide can be properly arranged on the surface of the carbon.

The negative electrode material according to this embodiment preferably includes the tungsten trioxide having the hexagonal and the orthorhombic crystal structure. When the hexagonal and the orthorhombic tungsten trioxide are arranged on the surface of the hard carbon, the tungsten trioxide can be properly arranged on the surface of the carbon.

The method for producing the negative electrode material according to the present invention includes a tungsten dissolution step, a silicon addition step, a primary intermediate material formation step, and a negative electrode material formation step. At the tungsten dissolution step, the tungsten trioxide (tungsten trioxide raw material) is added to the solution for dissolution and dissolved. At the silicon addition step, the silicon (silicon raw material) is added to the solution for dissolution in which the tungsten trioxide is dissolved to produce the solution for dissolution in which the tungsten trioxide and the silicon are dispersed. At the primary intermediate material formation step, the liquid component in the formed solution for dissolution is removed to form the primary intermediate material. At the carbon dissolution step, the primary intermediate material and the hard carbon (carbon raw material) are dissolved in a liquid. At the negative electrode material formation step, the liquid component in the liquid is removed to produce the negative electrode material. In the method for producing the negative electrode material according to this embodiment, after the primary intermediate material is produced from the solution for dissolution in which the tungsten trioxide and the silicon are dissolved, the primary intermediate material and the hard carbon are dissolved in the liquid to produce the negative electrode material, so that it becomes possible for the tungsten trioxide and the silicon to be properly arranged on the surface of the carbon.

Also, the method for producing the negative electrode material according to this embodiment includes a tungsten dissolution step, a silicon and carbon addition step, and a negative electrode material formation step. At the tungsten dissolution step, the tungsten trioxide (tungsten trioxide raw material) is added to the solution for dissolution and dissolved. At the silicon and carbon addition step, the silicon (silicon raw material) and the hard carbon (carbon raw material) are added to the solution for dissolution in which the tungsten trioxide is dissolved to produce the solution for dissolution in which the tungsten trioxide, the silicon, and the hard carbon are dispersed. At the negative electrode material formation step, the liquid component in the formed solution for dissolution is removed to form the negative electrode material. In the method for producing the negative electrode material according to this embodiment, by adding the silicon and the hard carbon to the solution for dissolution in which the tungsten trioxide is dissolved thereby producing the negative electrode material, the tungsten trioxide and the silicon can be properly arranged on the surface of the carbon.

In the method for producing the negative electrode material according to this embodiment, the ratio of the addition amount of the tungsten trioxide to the total amount including the addition amount of the tungsten trioxide, the addition amount of the hard carbon, and the addition amount of the silicon is made in the range of 1% or more by weight to 10% or less by weight, preferably in the range of 2% or more by weight to 8% or less by weight, while more preferably in the range of 5% or more by weight to 8% or less by weight. By setting the addition amount of the tungsten trioxide in this range, the tungsten trioxide can be properly formed on the surface of the hard carbon, so that as the negative electrode the battery characteristics can be enhanced.

In the method for producing the negative electrode material according to this embodiment, the ratio of the addition amount of the silicon to the total amount including the addition amount of the tungsten trioxide, the addition amount of the hard carbon, and the addition amount of the silicon is made in the range of 1% or more by weight to 10% or less by weight, preferably in the range of 2% or more by weight to 8% or less by weight, while more preferably in the range of 5% or more by weight to 8% or less by weight. By setting the addition amount of the silicon in this range, the silicon can be properly formed on the surface of the hard carbon, so that as the negative electrode the battery characteristics can be enhanced.

At the tungsten dissolution step, it is preferable to use an alkaline solution as the solution for dissolution. By using the alkaline solution, the tungsten trioxide can be properly dissolved.

EXAMPLES (Production Conditions)

Next, Examples will be described. In Example 1, the hard carbon, the tungsten trioxide, and the silicon were used to produce the negative electrode material by the first production method using the solution method described in the embodiment. Specifically, 5 ml of an ammonia solution with a concentration of 28% by weight and 0.05 g of the $WO_3$ raw material were added to a 50-ml beaker, and then, the resulting mixture was stirred at 40° C. for 12 hours to dissolve the $WO_3$ raw material into the ammonia solution. In addition, 0.05 g of SDS was added to this ammonia solution at the weight ratio of 1:1 to the $WO_3$ raw material, and then, the resulting mixture was stirred at room temperature for 4 hours to dissolve the SDS into the ammonia solution. Next, 0.05 g of the silicon raw material was added to this ammonia solution at the weight ratio of 1:1 to the $WO_3$ raw material, and then, the resulting mixture was stirred at room temperature for 4 hours to dissolve the silicon raw material into the ammonia solution. After this ammonia solution was stirred, this was dried by heating at 80° C. for 12 hours to produce the primary intermediate material. The primary intermediate material thus obtained was introduced into a tubular furnace, and kept under a nitrogen atmosphere at room temperature for 2 hours; then, under a nitrogen atmosphere the temperature was raised continuously at the rate of 3° C./minute to 200° C., then at the rate of 1° C./minute to 550° C., and then at the rate of 3° C./minute to 700° C., and then this was kept at this temperature for 2 hours to produce the primary intermediate material. Next, the primary intermediate material thus produced, 5 ml of pure water, 0.053 g of SDS, and 0.95 g of the carbon raw material were added in sequence. After the resulting liquid was stirred for 4 hours until the carbon material is dispersed in pure water, this was dried by heating at 80° C. for 12 hours to produce the negative electrode intermediate. The resulting negative electrode intermediate was introduced into the tubular furnace, and kept under a nitrogen atmosphere at room temperature for 2 hours; then, under a nitrogen atmosphere the temperature was continuously raised at the rate of 3° C./minute to 200° C., at the rate of 1° C./minute to 550° C., and at the rate of 3° C./minute to 700° C., and then this was kept at this temperature for 2 hours to produce the negative electrode material.

In Example 1, the silicon raw material ratio, i.e., the addition amount of the silicon raw material, was made 5% by weight relative to the sum of the addition amount of the carbon raw material, the addition amount of the $WO_3$ raw material, and the addition amount of the silicon raw material. In Example 1, the addition amount of the $WO_3$ raw material was 0.05 g, the addition amount of the silicon raw material was 0.05 g, and the addition amount of the carbon raw material was 0.95 g.

In Example 1, the silicon raw material was prepared as follows. First, a few mm of high purity silicon chunks (purity of 11 N) were crushed using a jaw crusher, and then the crushed silicon particles were separated using a sieve having a 0.5 mm opening. Next, the silicon particles having passed through the sieve having a 0.5 mm opening were ground in a ball mill for 2 hours to obtain silicon fine particles (silicon raw material). The particle size distribution of the obtained silicon particles was obtained by the laser diffraction scattering particle size distribution method (equipment name "Microtrac MT3300EXII"). The volume average particle diameter and the d50 (median diameter) of the silicon particles were 3.34 μm and 0.33 μm, respectively. The maximum volume diameter and the minimum volume diameter of the silicon particles were 62.23 μm and 0.066 μm, respectively.

In Example 2, the hard carbon, the tungsten trioxide, and the silicon were used to produce the negative electrode material by the second production method using the solution method described in the embodiment. Specifically, 5 ml of an ammonia solution with a concentration of 28% and 0.05 g of the $WO_3$ raw material were added to a 50-ml beaker, and then, the resulting mixture was stirred at 40° C. for 12 hours to dissolve the $WO_3$ raw material into the ammonia solution. In addition, 0.05 g of SDS was added to this ammonia solution at the weight ratio of 1:1 to the $WO_3$ raw material, and then, the resulting mixture was stirred at room temperature for 4 hours to dissolve the SDS into the ammonia solution. Then, 5 ml of pure water, 0.053 g of the silicon raw material, and 0.95 g of the carbon raw material were added to this ammonia solution in turn, and the resulting mixture was stirred at room temperature for 4 hours to dissolve the silicon raw material into the ammonia solution. The resulting ammonia solution was then dried by heating at 80° C. for 12 hours to produce the negative electrode intermediate. The resulting negative electrode intermediate was introduced into the tubular furnace; and then, the temperature was continuously raised at the rate of 3° C./minute to 200° C., at the rate of 1° C./minute to 550° C., and at the rate of 3° C./minute to 700° C., and then, this was kept at this temperature for 2 hours to produce the negative electrode material.

In Example 2, the silicon raw material ratio was made 8% by weight. In Example 2, the addition amount of the $WO_3$ raw material was made 0.03 g, the addition amount of the silicon raw material was made 0.053 g, and the addition amount of the carbon raw material was made 0.95 g.

In Comparative Example 1, the hard carbon and the silicon were used to produce the negative electrode material. Specifically, 0.05 g of SDS was added to 5 ml of pure water in a 50-ml beaker; then, the resulting solution was stirred. In addition, 0.06 g of the silicon raw material and 0.94 g of the carbon raw material were added; then, after the resulting mixture was stirred for 4 hours, this was heated at 80° C. for 12 hours. Next, this was further heated at 700° C. for 2 hours at the heating rate of 5° C./minute to produce the negative electrode material of Comparative Example 1. In the Comparative Example, the addition amount of the silicon raw material was 6% by weight relative to the sum of the addition amount of the hard carbon and the addition amount of the silicon raw material. In the Comparative Example, the negative electrode material was produced by the solution method.

In Comparative Example 2, the hard carbon and the $WO_3$ raw material were used to produce the negative electrode material. Specifically, 0.05 g of SDS was added to 5 ml of pure water in a 50-ml beaker; then, the resulting solution was stirred. In addition, 0.25 ml of a $(NH_4)_2WO_4$ solution and 0.95 g of the carbon raw material were added; then, after the resulting mixture was stirred for 4 hours, this was heated at 80° C. for 12 hours. Next, this was further heated at 700° C. for 2 hours at the heating rate of 5° C./minute to produce the negative electrode material of Comparative Example 2. In the Comparative Example, the addition amount of the $WO_3$ raw material was 6% by weight relative to the sum of the addition amount of the hard carbon and the addition amount of the $WO_3$ raw material. In the Comparative Example, the negative electrode material was produced by the solution method.

(Negative Electrode Material Evaluation Results)

The negative electrode materials produced in Examples and Comparative Examples by the solution method described above were evaluated. For evaluation, the photos of the negative electrode materials were taken by SEM to observe whether the $WO_3$ material and the silicon were formed on the surface of the carbon. XRD was also used to check for the presence of the peaks due to the carbon, the tungsten trioxide, and the silicon. The negative electrode was produced from the negative electrode material, and this was repeatedly charged and discharged to measure the capacity thereof.

Figure 6:
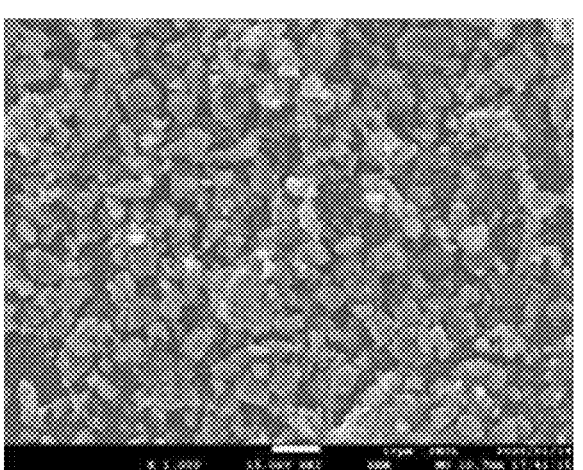
FIG. 6 includes photos of a negative electrode material of Example.
Figure 6:
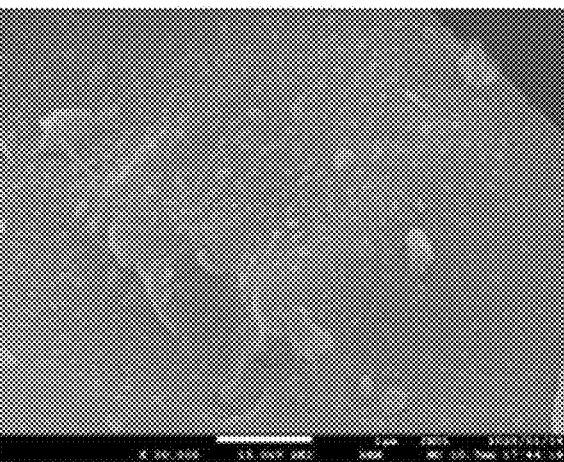
Figure 7:
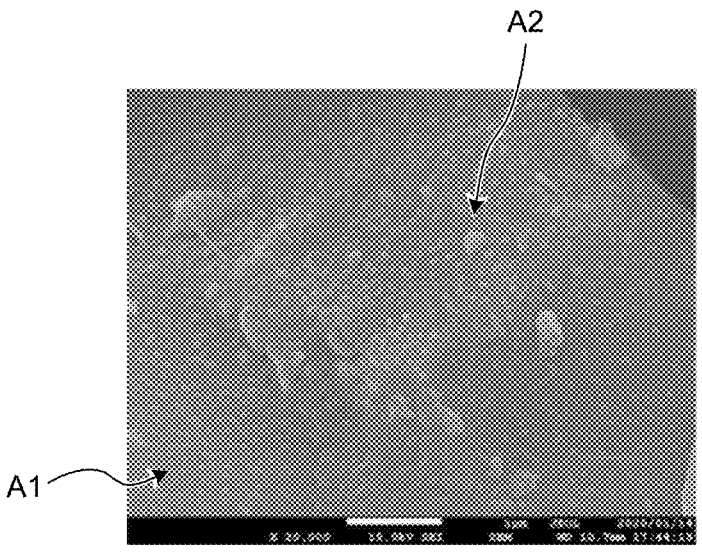
FIG. 7 is a photo of the negative electrode material of Example.
Figure 8:
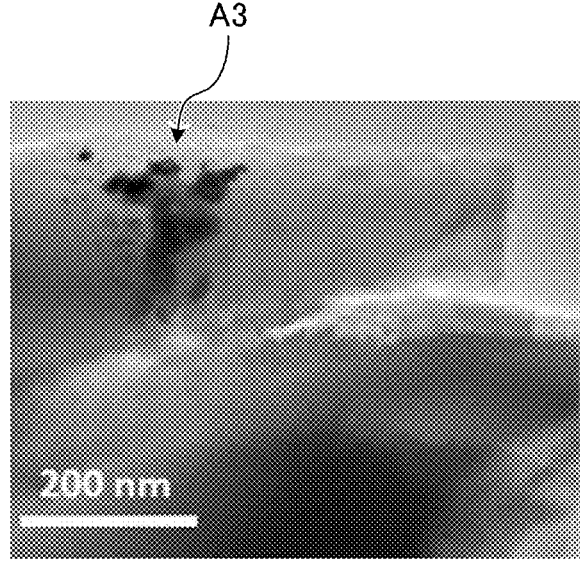
FIG. 8 includes photos of the negative electrode material of Example.
Figure 8:
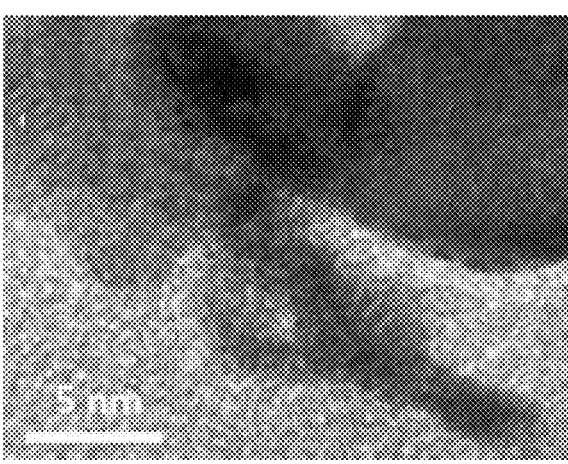
Figure 9:
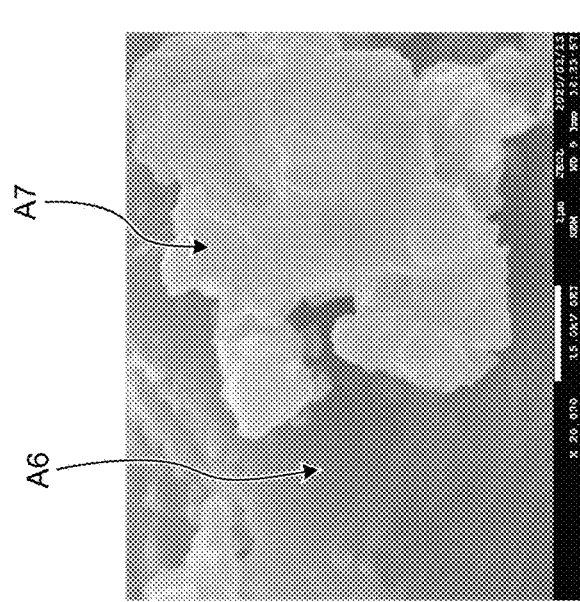
FIG. 9 includes photos of the negative electrode material of Example.
Figure 9:
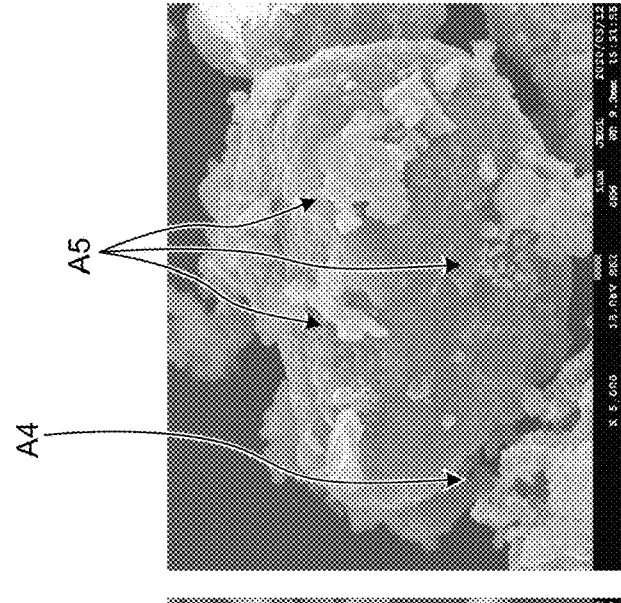
Figure 9:
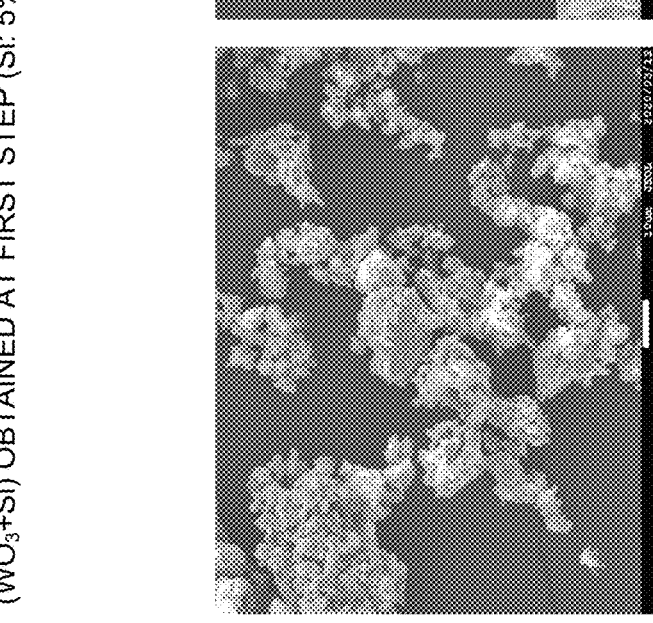
Figure 10:
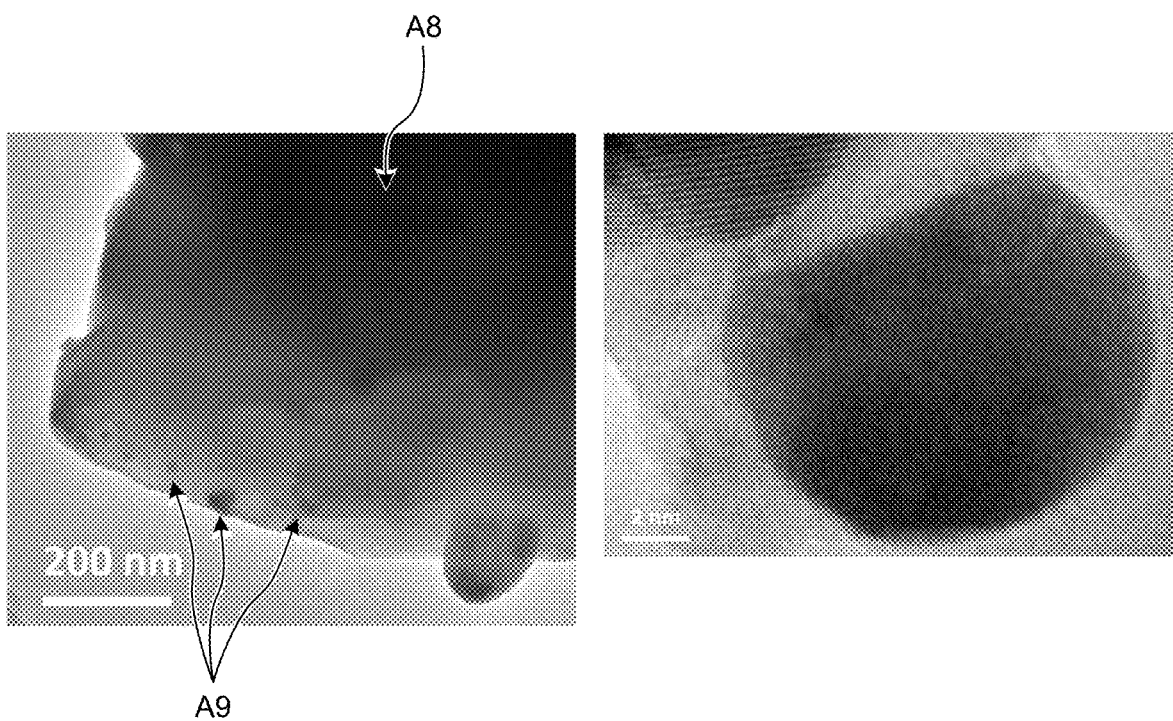
FIG. 10 includes photos of a primary intermediate material of Example.
Figure 11:
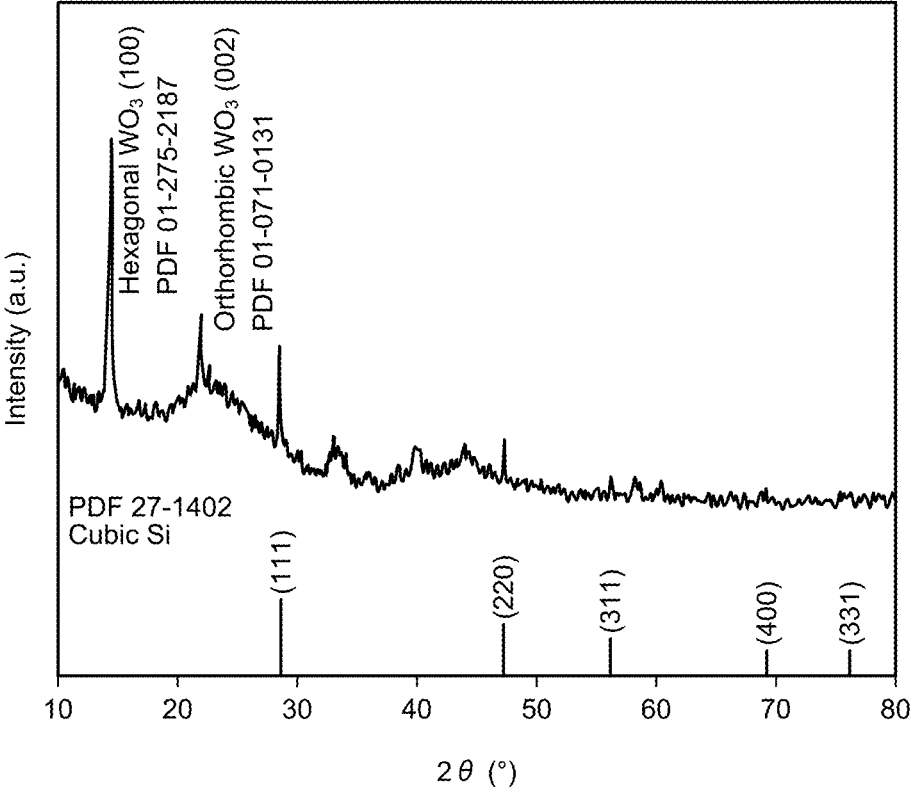
FIG. 11 is an XRD analysis result of the negative electrode material of Example.

Example 1 will be described by using FIG. 6 through FIG. 11. FIG. 6 includes photos of the negative electrode material of Example. FIG. 7 includes photos of the negative electrode material of Example. FIG. 8 includes photos of the negative electrode material of Example. FIG. 9 includes photos of the negative electrode material of Example. FIG. 10 includes photos of the primary intermediate material of Example. FIG. 11 is an XRD analysis result of the negative electrode material of Example. FIG. 6 includes photos of the negative electrode material of Example 1 taken by SEM. FIG. 7 includes photo of the negative electrode material of Example 1 taken by SEM, indicating the hard carbon. FIG. 8 includes photos of the negative electrode material of Example 1 taken by TEM. FIG. 9 includes photos of the primary intermediate material, which is the intermediate of the negative electrode material of Example 1, taken by SEM. FIG. 10 includes photos of the primary intermediate material, which is the intermediate of the negative electrode material of Example 1, taken by TEM. FIG. 11 is an XRD analysis result of the negative electrode material of Example 1. As can be seen in FIGS. 6 and 7, the SEM photos confirm that the negative electrode material of Example 1 has the $WO_3$ particles 32 and the silicon particles 33 indicated by Arrow A2 penetrated into the surface of the carbon particle 30 indicated by Arrow A1. In the negative electrode material of Example 1, the $WO_3$ particles 32 and the silicon particles 33 are found to be arranged on the surface of the carbon particles 30 in a fixed state. In the solution method, it is assumed that the $WO_3$ raw material dissolved in ammonia solution is fixed to the silicon surface and further to the functional group of the hard carbon. As can be seen in FIG. 8, according to the TEM photos, it was confirmed that the $WO_3$ particle 32 and the silicon particle 33 are composited on the surface of the carbon particle 30, as indicated by Arrow A3. For example, according to the TEM photos, it was observed the composite in which the silicon particle 33 is arranged on the surface of the carbon particle 30 and the $WO_3$ particle 32 on the surface of the silicon particle 33, and the composite in which the $WO_3$ particle 32 is arranged on the surface of the carbon particle 30 and the silicon particle 33 on the surface of the $WO_3$ particle 32. As can be seen in FIGS. 9 and 10, in the primary intermediate material containing the $WO_3$ material and the silicon, it was confirmed that the silicon nanoparticles are aggregated, as indicated by Arrows A4, A6, and A8. In the primary intermediate material, it was confirmed that the $WO_3$ nanoparticles indicated by Arrows A5, A7, and A9 are coated or attached to the surface of the aggregated silicon nanoparticles. It is presumed that the composite of the $WO_3$ particles 32 with the silicon particles 33, the $WO_3$ particles 32, and the silicon particles 33 are formed on the surface of the carbon particles 30. As can be seen in FIG. 11, XRD of the negative electrode material of Example 1 confirmed the peak of the tungsten trioxide having the hexagonal crystal structure. The XRD of the primary intermediate material also confirmed the peak of the tungsten trioxide having the hexagonal crystal structure.

Figure 12:
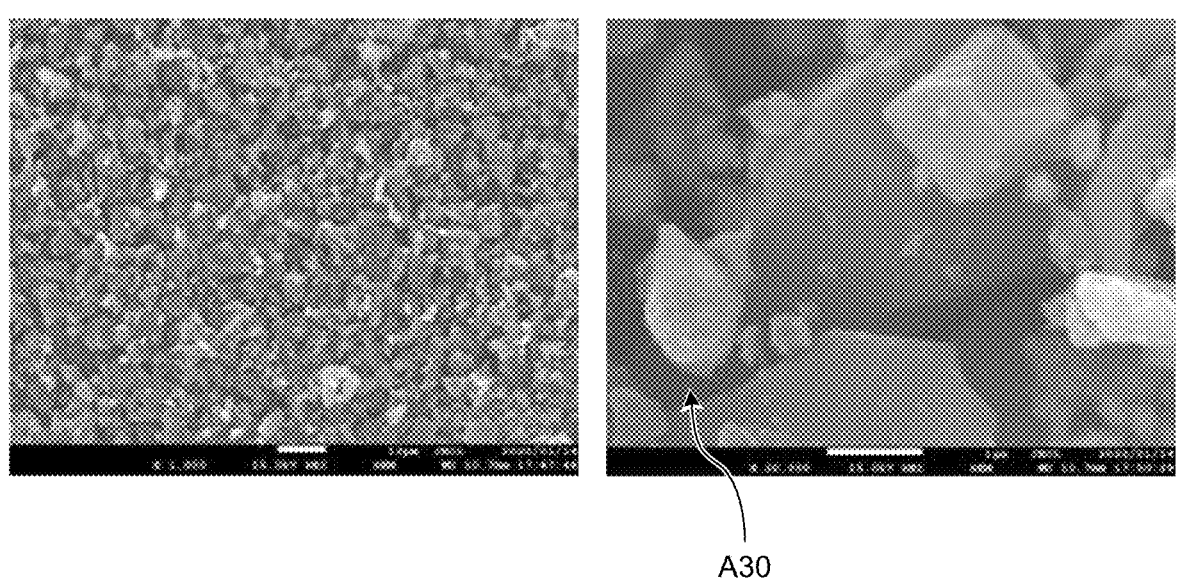
FIG. 12 includes photos of a negative electrode material of Example.
Figure 13:
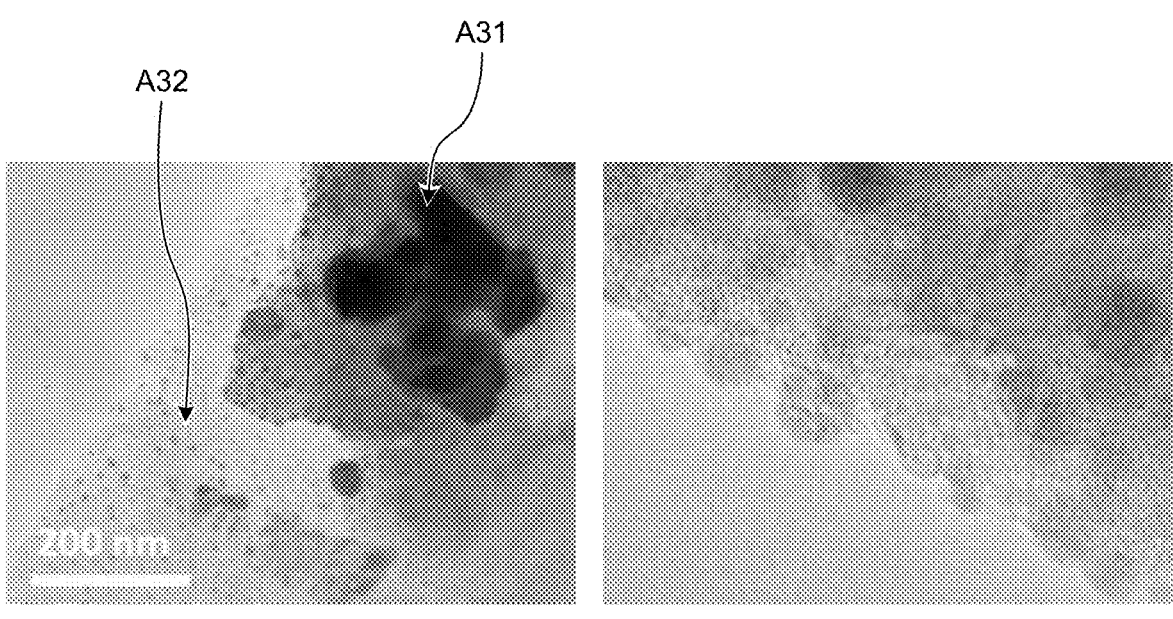
FIG. 13 includes photos of the negative electrode material of Example.
Figure 14:
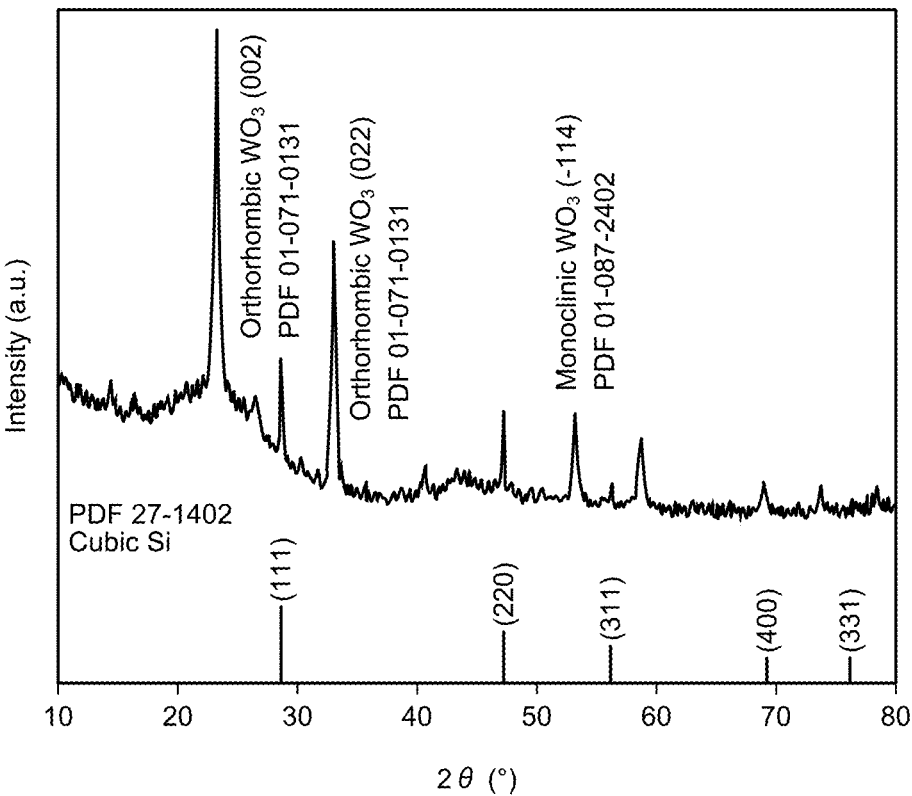
FIG. 14 is an XRD analysis result of the negative electrode material of Example.

Example 2 will be described by using FIG. 12 through FIG. 14. FIG. 12 includes photos of the negative electrode material of Example. FIG. 13 includes photos of the negative electrode material of Example. FIG. 14 is an XRD analysis result of the negative electrode material of Example. FIG. 12 includes photos of the negative electrode material of Example 2 taken by SEM. FIG. 13 includes photos of the negative electrode material of Example 2 taken by TEM. FIG. 14 is an XRD analysis result of the negative electrode material of Example 2. As can be seen in FIG. 12, according to the SEM photos, it was confirmed that in the negative electrode material of Example 2, the cluster of the aggregates of the silicon particles 33 indicated by Arrow A30 is formed on the surface of the carbon particle 30. In the negative electrode material of Example 2, it was confirmed that the silicon nanoparticles were aggregated on the surface of the carbon particle 30. As can be seen in FIG. 13, according to the TEM photos, it was confirmed that the $WO_3$ particle 32 indicated by Arrow A32 and the silicon particle 33 indicated by Arrow A31 are identified on the surface of carbon particle 30; it was not confirmed that the $WO_3$ particle 32 and the silicon particle 33 are composited. As can be seen in FIG. 14, in XRD, peaks of the tungsten trioxide having the hexagonal structure and the orthorhombic crystal structure are observed in Example 2.

Figure 15:
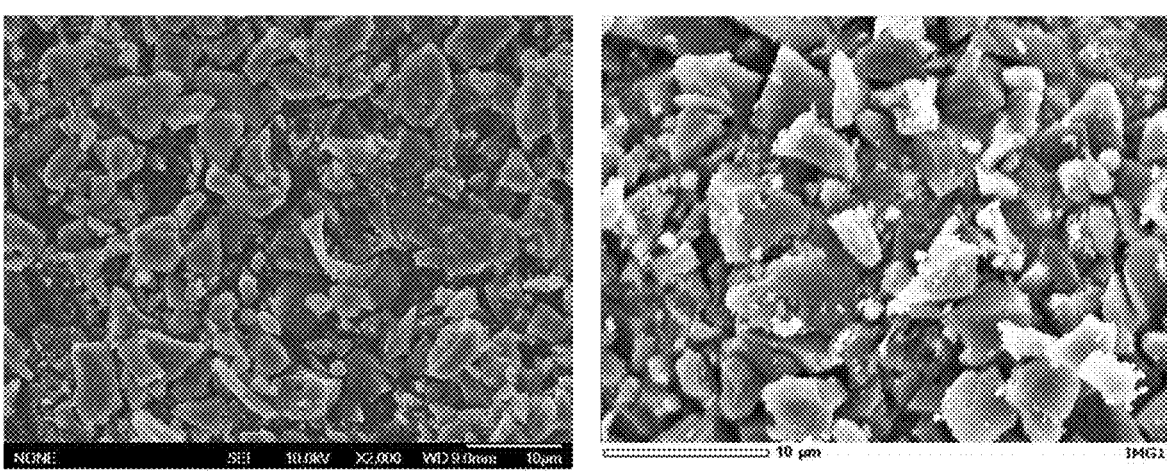
FIG. 15 includes photos of a negative electrode material of Comparative Example.
Figure 16:
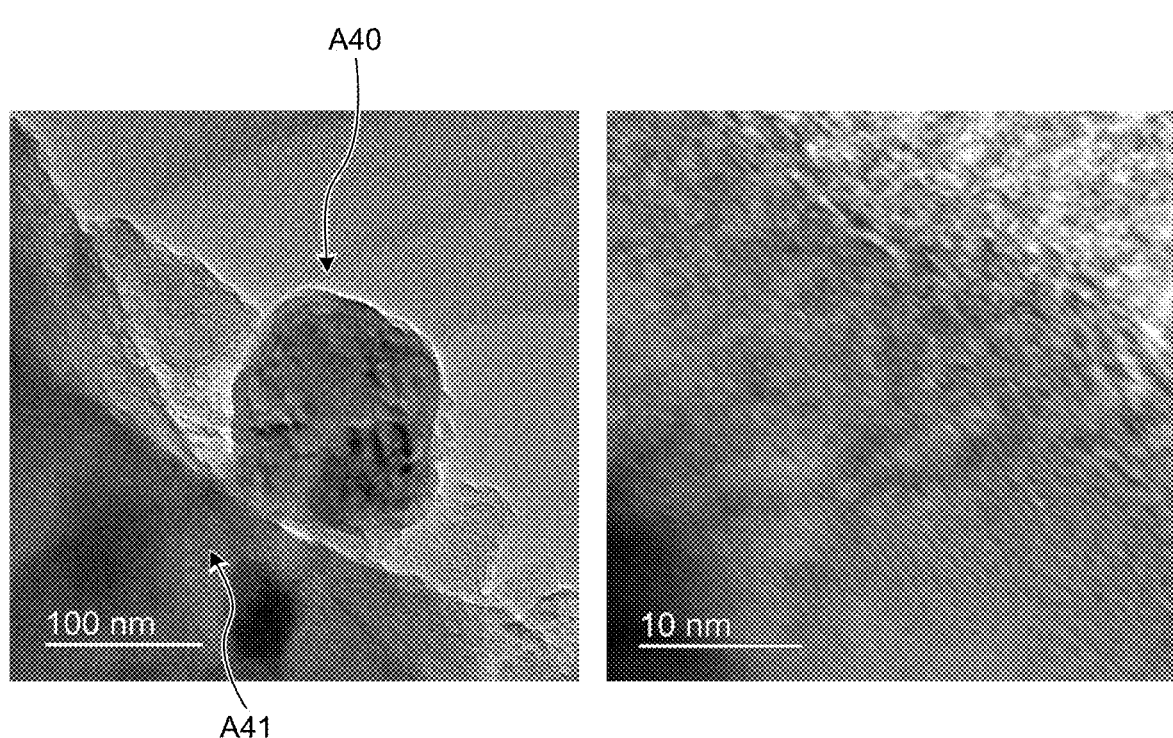
FIG. 16 includes photos of the negative electrode material of Comparative Example.

Comparative Example 1 will be described by using FIG. 15 and FIG. 16. FIG. 15 includes photos of the negative electrode material of Comparative Example. FIG. 16 includes photos of the negative electrode material of Comparative Example. FIG. 15 includes photos of the negative electrode material of Comparative Example 1 taken by SEM. As can be seen in FIG. 15, according to the SEM photos, it was confirmed that the negative electrode material of Comparative Example 1 has the silicon particle 33 composited on the surface of the hard carbon. As can be seen in FIG. 16, according to the TEM photos, it was confirmed that the negative electrode material of Comparative Example 1 has the silicon particle 33, indicated by Arrow A40, having the particle size larger than several 10 nm on the surface of the hard carbon as indicated by Arrow A41.

Figure 17:
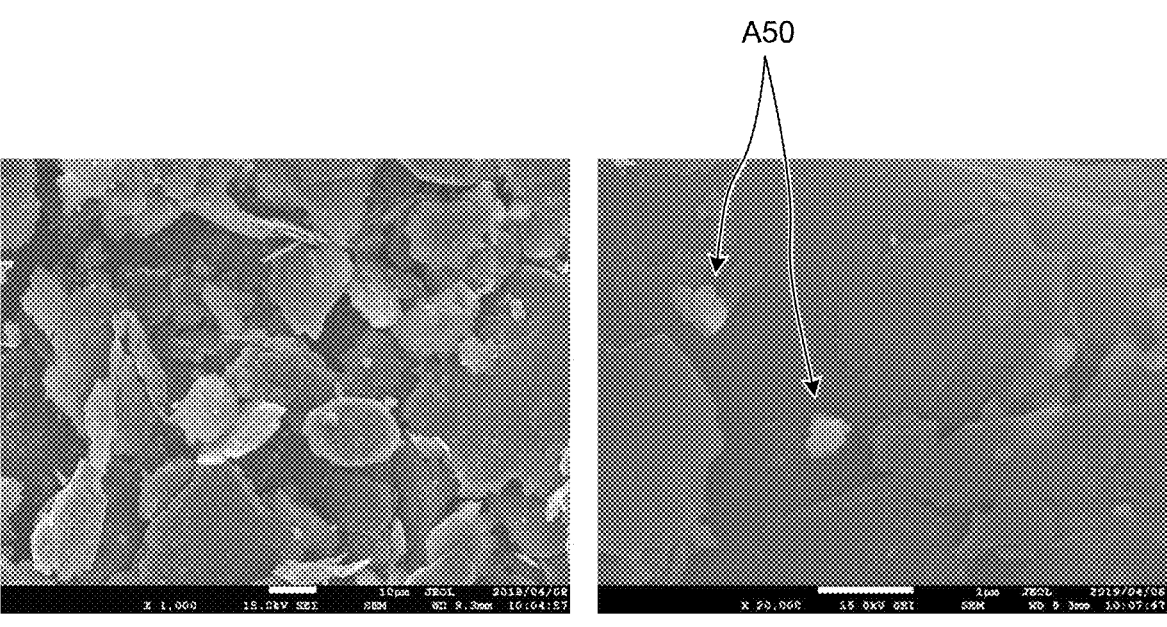
FIG. 17 includes photos of the negative electrode material of Comparative Example.
Figure 18:
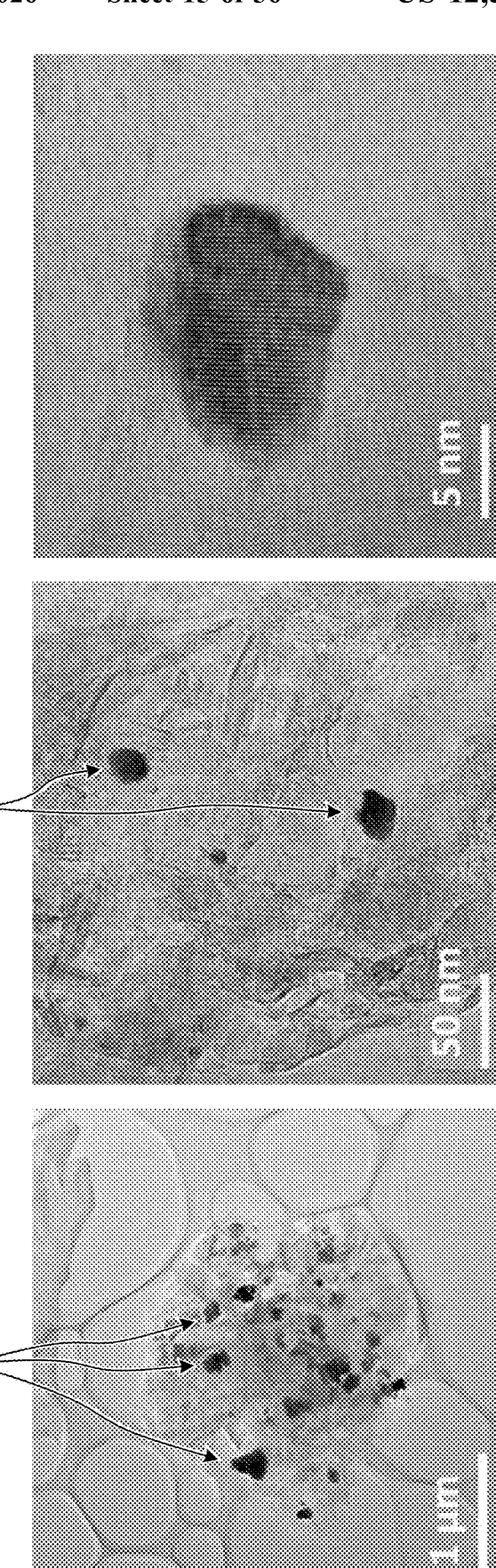
FIG. 18 includes photos of the negative electrode material of Comparative Example.

Comparative Example 2 will be described by using FIG. 17 and FIG. 18. FIG. 17 includes photos of the negative electrode material of Comparative Example. FIG. 18 includes photos of the negative electrode material of Comparative Example. FIG. 17 includes photos of the negative electrode material of Comparative Example 2 taken by SEM. As can be seen in FIG. 17, according to the SEM photos, it was confirmed that the negative electrode material of Comparative Example 2 has the particulate $WO_3$ particle 32 indicated by Arrow A50 on the surface of the hard carbon and that the $WO_3$ particle 32 is not adhered to the surface of the hard carbon. As can be seen in FIG. 18, according to the TEM photos, it was confirmed that the negative electrode material of Comparative Example 2 has the $WO_3$ particle 32 having the particle size larger than several 10 nm on the surface of the hard carbon, as indicated by Arrows A51 and A52.

Figure 19:
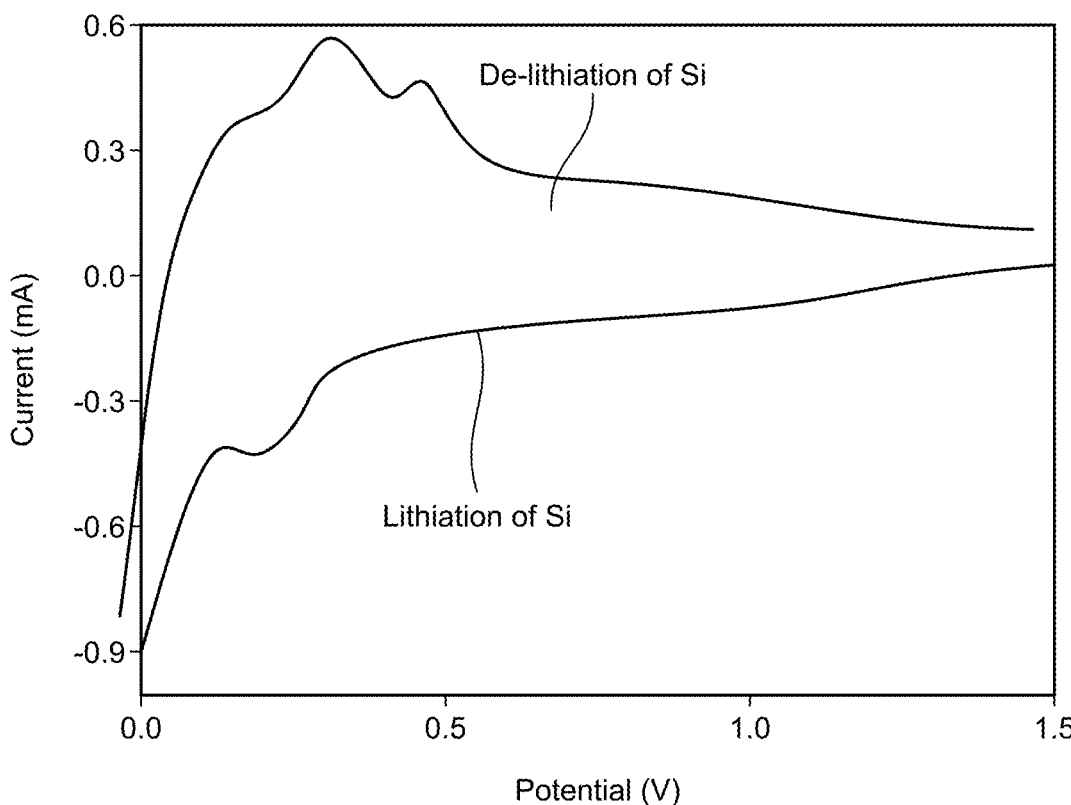
FIG. 19 is a drawing to illustrate a relationship between a voltage and a current in a negative electrode using the negative electrode material of Example.
Figure 20:
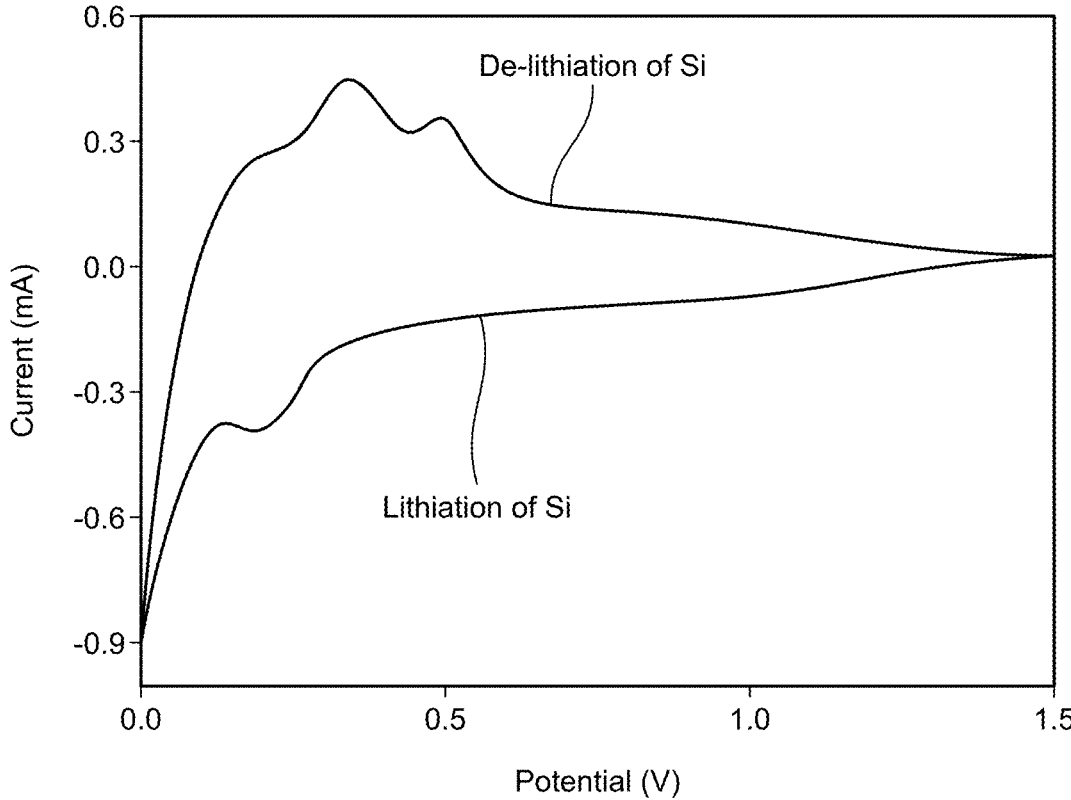
FIG. 20 is a drawing to illustrate a relationship between a voltage and a current in a negative electrode using the negative electrode material of Example.

Next, evaluation of the negative electrodes using the negative electrode materials of Examples and Comparative Examples will be described. First, the results of voltage and current measurements at the negative electrodes using the negative electrode materials of Examples will be explained by using FIG. 19 and FIG. 20. FIG. 19 is the drawing to illustrate the relationship between a voltage and a current in the negative electrode using the negative electrode material of Example. FIG. 20 is the drawing to illustrate the relationship between voltage and current in the negative electrode using the negative electrode material of Example. FIG. 19 is the drawing to illustrate the relationship between a voltage and a current in the negative electrode using the negative electrode material of Example 1. FIG. 20 is the drawing to illustrate the relationship between a voltage and a current in the negative electrode using the negative electrode material of Example 2. Peaks of lithiation and delithiation of the silicon material were confirmed in both Example 1 and Example 2. Accordingly, it was confirmed that charging and discharging can be properly carried out in both Example 1 and Example 2.

Next, the results of the capacity measurements of the negative electrodes using the negative electrode materials of Examples and Comparative Examples after the repeated charge-discharge cycles will be described. In the following, in Example 3, the negative electrode material produced in the same manner as in Example 1 was used, and the silicon raw material ratio was set at 2% by weight. In Example 4, the negative electrode material produced in the same manner as in Example 1 was used, and the silicon raw material ratio was set at 8% by weight. Comparative Example 2 illustrates the example in which the addition amount of the $WO_3$ raw material was 5% by weight. Also, the results of the HC measurements are described as Comparative Example 3.

TABLE 2

| | Specific capacity at 0.2 C (mAh g$^{-1}$) | Specific capacity at 3.2 C (mAh g$^{-1}$) |
|---|---|---|
| Example 1: HC—Si—$WO_3$-1 | 237 | 137 |
| Example 2: HC—Si—$WO_3$-2 | 227 | 128 |
| Example 3: HC—Si—$WO_3$-1 (Si: 2% by weight) | 228 | 107 |
| Example 4: HC—Si—$WO_3$-1 (Si: 8% by weight) | 247 | 133 |
| Comparative Example 1: HC—Si | 316 | 104 |
| Comparative Example 2: HC—$WO_3$ (5% by weight) | 185 | 115 |
| Comparative Example 3: HC | 160 | 103 |

Figure 21:
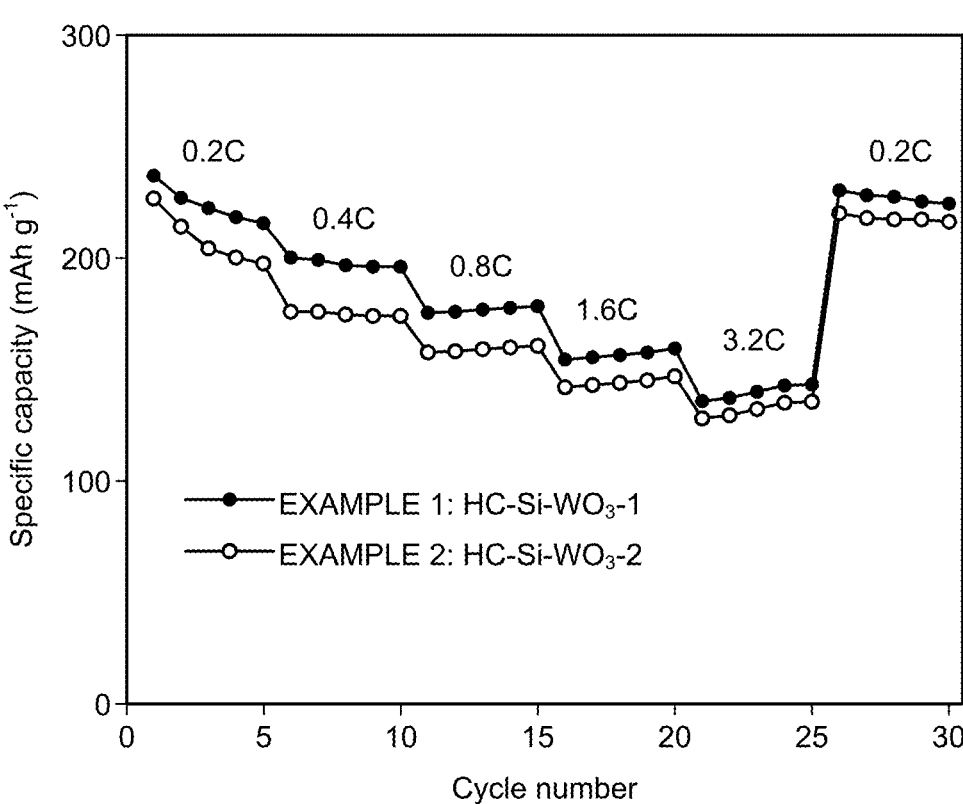
FIG. 21 is a drawing to illustrate the measured capacities of the negative electrodes using the negative electrode materials of Examples.

FIGS. 21 through 26 illustrate the measured capacities of the negative electrodes using the negative electrode materials of Examples and Comparative Examples. FIG. 21 is a drawing to illustrate the measured capacities of the negative electrodes using the negative electrode materials of Examples. FIG. 21 is a graph illustrating the measured capacities of the negative electrodes of Example 1 and Example 2 at each cycle when the C-rate was varied at each predetermined cycle number. The C-rate is the ratio of the discharge (charge) current value to the battery capacity (in this case, the capacity of the negative electrode). For example, discharging the negative electrode having the capacity of 10 Ah at the C-rate of 1 C and the cycle number of zero means the discharge at the current of 10 A. One cycle here refers to discharging until the capacity reaches zero at the designated C-rate and then charging to the maximum capacity thereof. The horizontal axis in FIG. 21 refers to the number of the cycle (number of the charge/discharge cycle), and the vertical axis refers to the capacity of the negative electrode per gram (mAh/g) when charged to the maximum capacity thereof after discharge. FIG. 21 illustrates the capacities at each cycle when repeated five cycles of discharge and charge at 0.2 C, five cycles of discharge and charge at 0.4 C, five cycles of discharge and charge at 0.8 C, five cycles of discharge and charge at 1.6 C, five cycles of discharge and charge at 3.2 C, and five cycles of discharge and charge at 0.2 C. In Example 1, it can be seen that the capacities at 0.2 C and at 3.2 C are 237 mAh/g and 137 mAh/g, respectively. In Example 2, it can be seen that the capacities at 0.2 C and at 3.2 C are 227 mAh/g and 128 mAh/g, respectively. It can be seen from FIG. 21 that Example 1 tends to maintain a higher capacity than Example 2.

Figure 22:
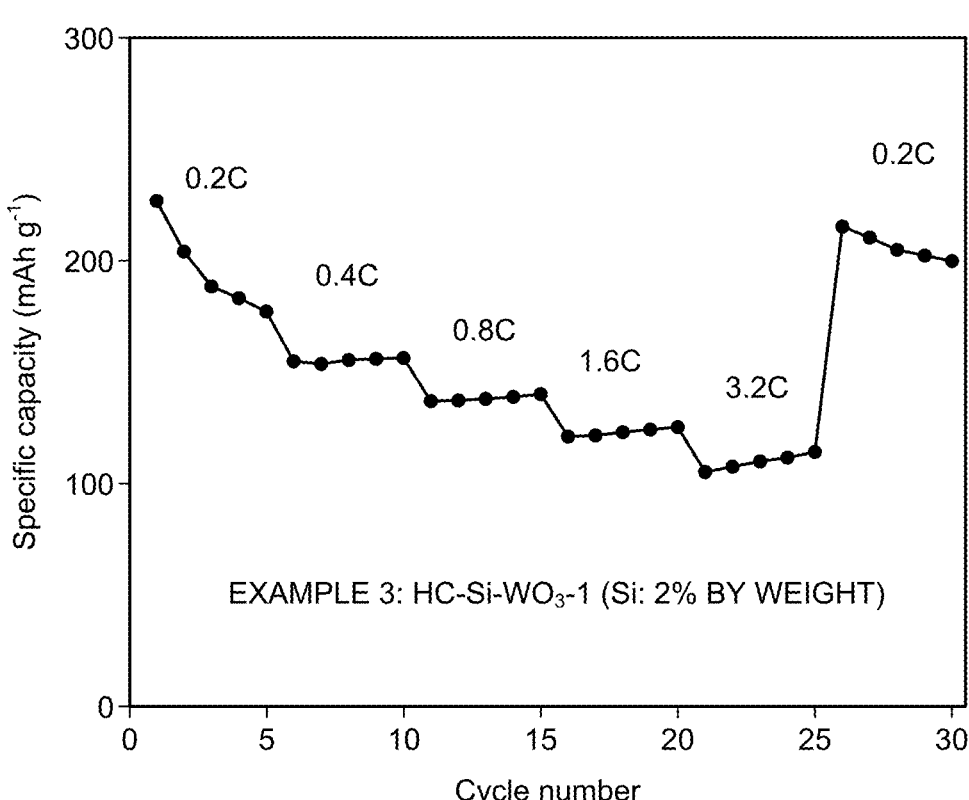
FIG. 22 is a drawing to illustrate the measured capacity of a negative electrode using a negative electrode material of Example.

FIG. 22 is the graph illustrating the measured capacity of the negative electrode material in Example 3 at each cycle when the C-rate was varied at each predetermined cycle number. The changing conditions of the C-rate are the same as those in FIG. 21. In Example 3, it can be seen that the capacities at 0.2 C and at 3.2 C are 228 mAh/g and 107 mAh/g, respectively.

Figure 23:
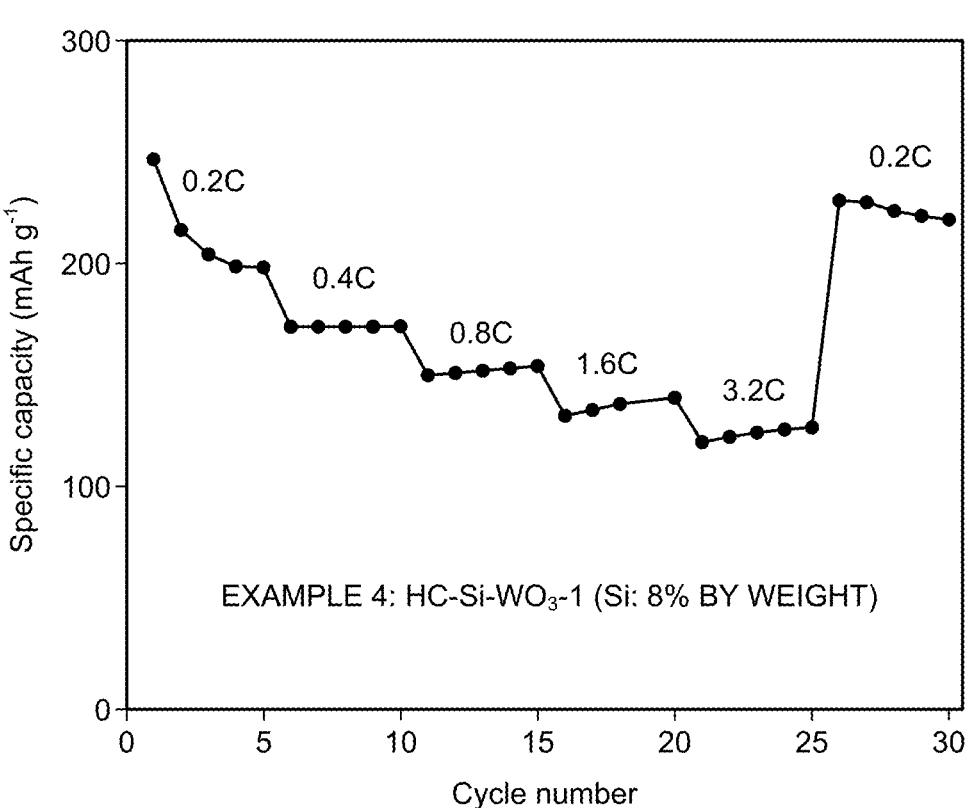
FIG. 23 is a drawing to illustrate the measured capacity of a negative electrode using a negative electrode material of Example.

FIG. 23 is the graph illustrating the measured capacity of the negative electrode material in Example 4 at each cycle when the C-rate was varied at each predetermined cycle number. The changing conditions of the C-rate are the same as those in FIG. 21. In Example 4, the capacities at 0.2 C and at 3.2 C are 247 mAh/g and 133 mAh/g, respectively.

Figure 24:
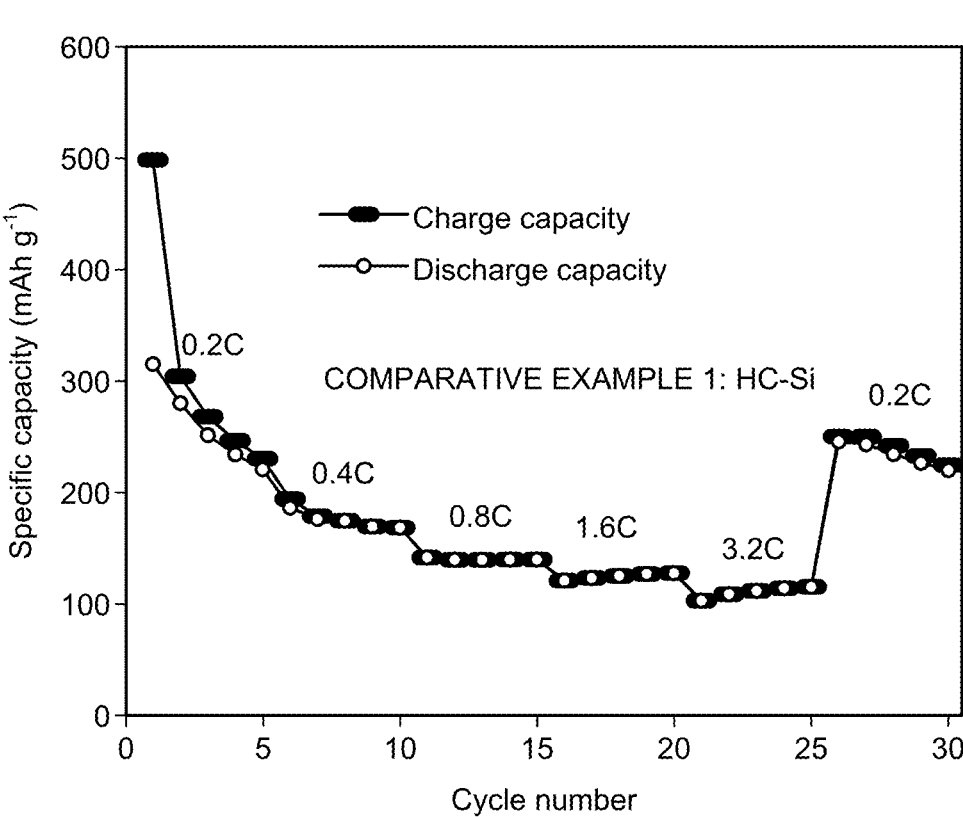
FIG. 24 is a drawing to illustrate the measured capacity of a negative electrode using the negative electrode material of Comparative Example.

FIG. 24 is a graph illustrating the measured capacity of the negative electrode using the negative electrode material of Comparative Example 1 at each cycle when the C-rate was varied at each predetermined cycle number. The changing conditions of the C-rate are the same as those in FIG. 21. In Comparative Example 1, it can be seen that the capacities at 0.2 C and at 3.2 C are 316 mAh/g and 104 mAh/g, respectively. It can be seen from FIG. 24 that in Comparative Example 1, the capacity tends to drop rapidly from the first to the fifth in the number of the cycle. In Comparative Example 1, it can be seen that as the number of the cycle increases, the capacity tends to be lower than in Examples 1 and 2.

Figure 25:
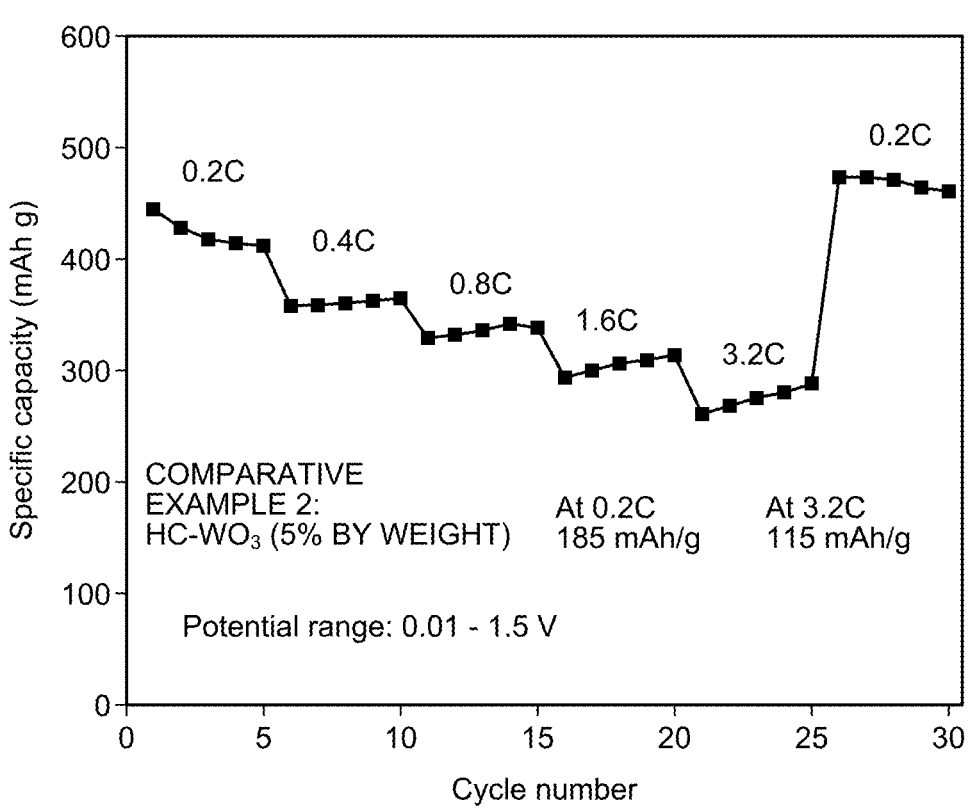
FIG. 25 is a drawing to illustrate the measured capacity of a negative electrode using a negative electrode material of Comparative Example.

FIG. 25 is a graph illustrating the measured capacity of the negative electrode using the negative electrode material of Comparative Example 2 at each cycle when the C-rate was varied at each predetermined cycle number. The changing conditions of the C-rate are the same as those in FIG. 21. In Comparative Example 2, it can be seen that the capacities at 0.2 C and at 3.2 C are 185 mAh/g and 115 mAh/g, respectively. It can be seen from FIG. 25 that in Comparative Example 2, the capacity tends to be higher than in Examples 1 and 2.

Furthermore, in the negative electrode material produced by using the graphite and the $WO_3$ raw material as Comparative Example 4, the capacity was found to be 59 mAh/g at 3.2 C. Therefore, it was found that Comparative Example 4 tends to have a lower capacity than Comparative Example 2. This result may suggest that the $WO_3$ raw material is not settled on the surface of the graphite and enters into among the graphites as the particles thereby resulting in blocking of the conductive path.

Figure 26:
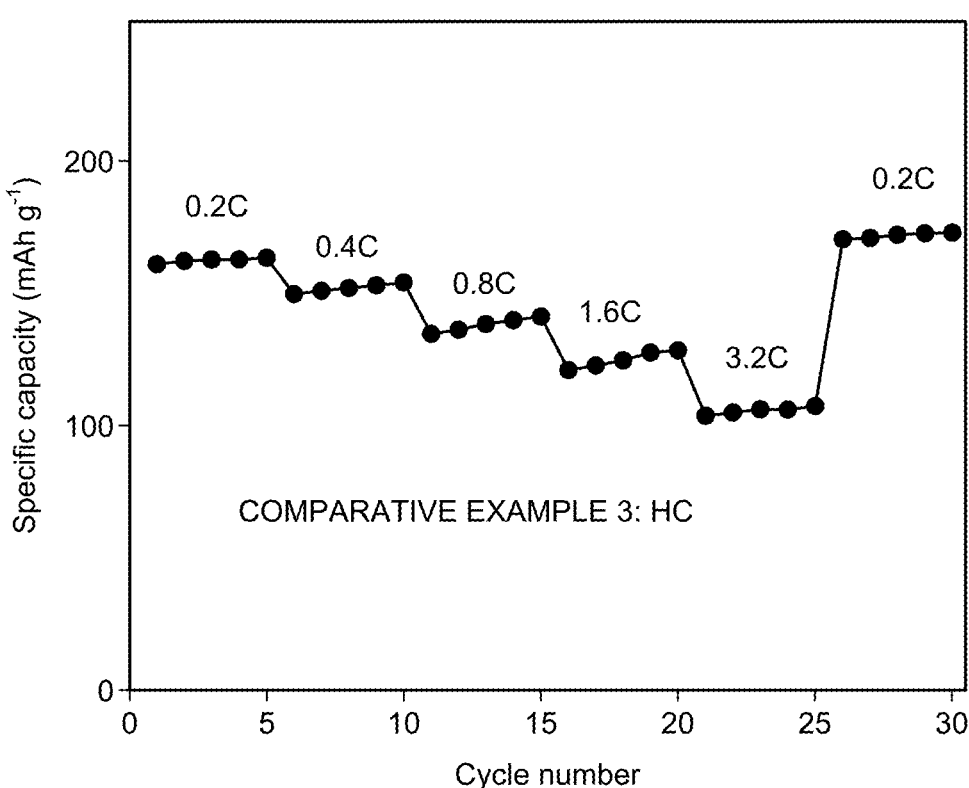
FIG. 26 is a drawing to illustrate the measured capacity of a negative electrode using a negative electrode material of Comparative Example.

FIG. 26 is a graph illustrating the measured capacity of the negative electrode using the negative electrode material of Comparative Example 3 at each cycle when the C-rate was varied at each predetermined cycle number. The changing conditions of the C-rate are the same as those in FIG. 21. In Comparative Example 3, it can be seen that the capacities at 0.2 C and at 3.2 C are 160 mAh/g and 103 mAh/g, respectively. It can be seen from FIG. 26 that in Comparative Example 3 the capacity tends to be lower than in Examples 1 and 2.

Figure 27:
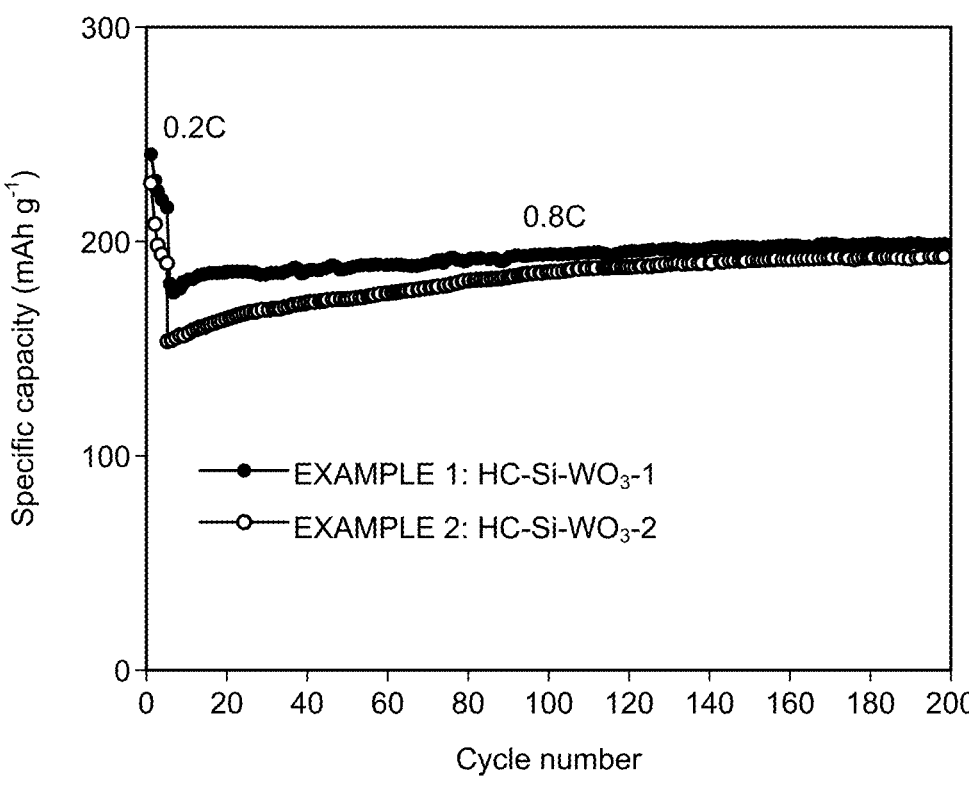
FIG. 27 is a drawing to illustrate the measured capacities of the negative electrodes using the negative electrode materials of Examples.

FIGS. 27 through 30 illustrate the measured capacities of the negative electrodes using the negative electrode materials of Examples and Comparative Examples. FIG. 27 is a drawing to illustrate the measured capacities of the negative electrodes using the negative electrode materials of Examples. FIG. 27 is a graph illustrating the measured capacities of the negative electrodes of Example 1 and Example 2 at each cycle when the C-rate was varied at each predetermined cycle number. The horizontal axis in FIG. 27 refers to the number of the cycle (number of the charge/discharge cycle), and the vertical axis refers to the capacity of the negative electrode per gram (mAh/g) when charged to the maximum capacity thereof after discharge. FIG. 27 illustrates the capacities at each cycle when repeated five cycles of discharge and charge at 0.2 C, and when repeated 200 cycles of discharge and charge at 0.8 C. In Example 1, it can be seen that the capacities at the first cycle and at the 200th cycle are 180 mAh/g and 200 mAh/g, respectively. In Example 2, it can be seen that the capacities at the first cycle and at the 200th cycle are 155 mAh/g and 193 mAh/g, respectively. It can be seen from FIG. 27 that Example 1 tends to maintain a higher capacity than Example 2.

Figure 28:
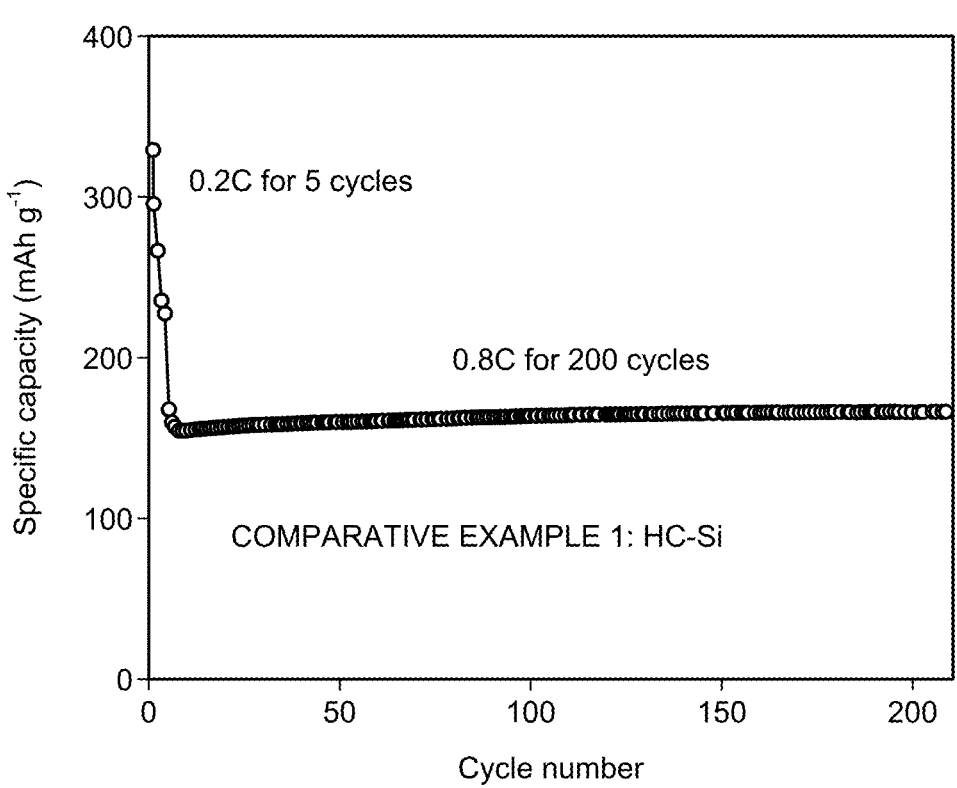
FIG. 28 is a drawing to illustrate the measured capacity of the negative electrode using the negative electrode material of Comparative Example.

FIG. 28 is a graph illustrating the measured capacity of the negative electrode using the negative electrode material of Comparative Example 1 at each cycle when the C-rate was varied at each predetermined cycle number. The changing conditions of the C-rate are the same as those in FIG. 27. In Comparative Example 1, it can be seen that the capacities at the first cycle and at the 200th cycle are 165 mAh/g and 162 mAh/g, respectively. It can be seen from FIG. 28 that in Comparative Example 1, the capacity tends to drop rapidly by the fifth cycle. In Comparative Example 1, it can be seen that as the number of the cycle increases, the capacity tends to be lower than in Examples 1 and 2.

Figure 29:
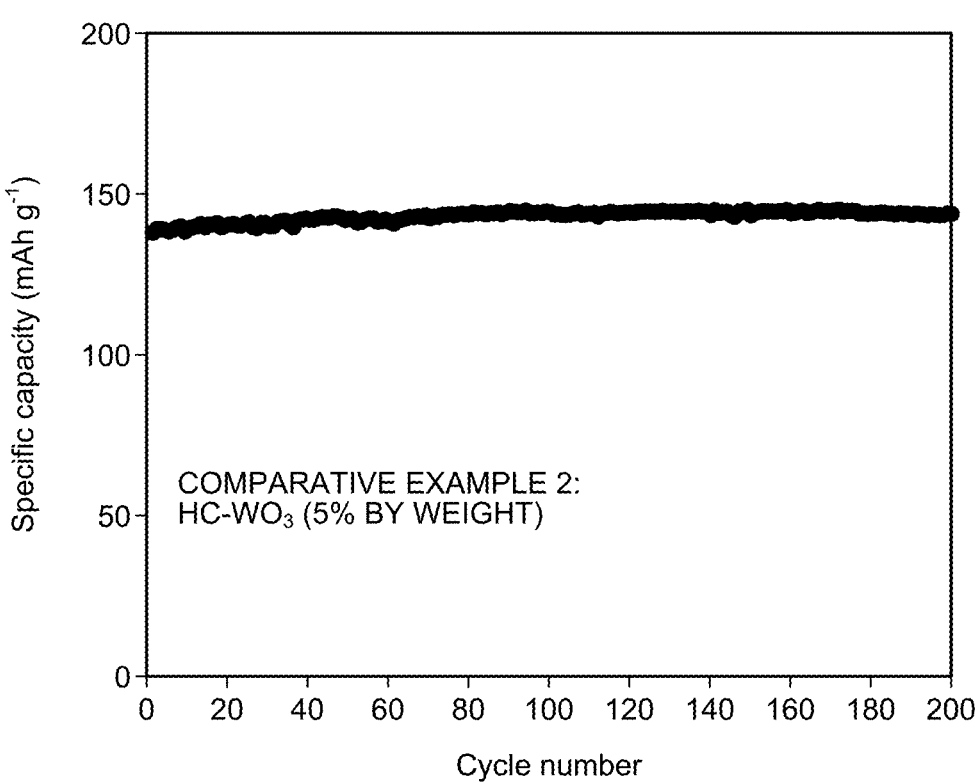
FIG. 29 is a drawing to illustrate the measured capacity of the negative electrode using the negative electrode material of Comparative Example.

FIG. 29 is a graph illustrating the measured capacity of the negative electrode using the negative electrode material of Comparative Example 2 at each cycle when the C-rate was varied at each predetermined cycle number. The changing conditions of the C-rate are the same as those in FIG. 27. In Comparative Example 2, it can be seen that the capacities at the first cycle and at the 200th cycle are 138 mAh/g and 144 mAh/g, respectively. It can be seen from FIG. 29 that in Comparative Example 2 the capacity tends to be lower than in Examples 1 and 2.

Figure 30:
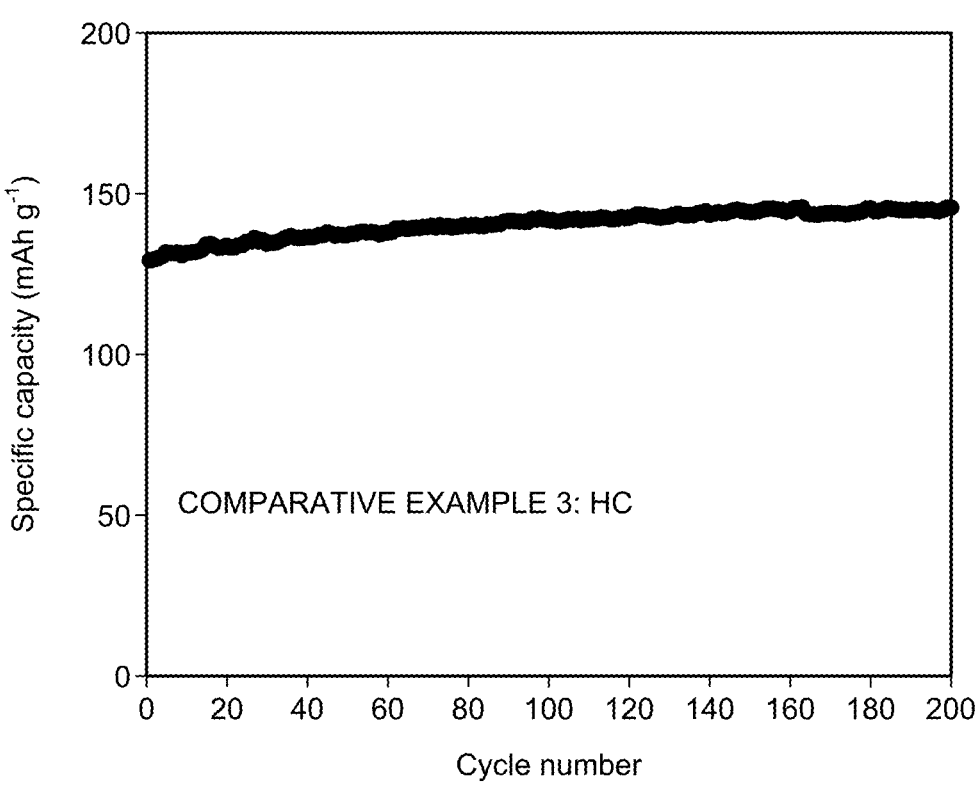
FIG. 30 is a drawing to illustrate the measured capacity of the negative electrode using the negative electrode material of Comparative Example.

FIG. 30 is a graph illustrating the measured capacity of the negative electrode using the negative electrode material of Comparative Example 3 at each cycle when the C-rate was varied at each predetermined cycle number. The changing conditions of the C-rate are the same as those in FIG. 27. In Comparative Example 3, it can be seen that the capacities at the first cycle and at the 200th cycle are 129 mAh/g and 145 mAh/g, respectively. It can be seen from FIG. 29 that in Comparative Example 3 the capacity tends to be lower than in Examples 1 and 2.

Figure 31:
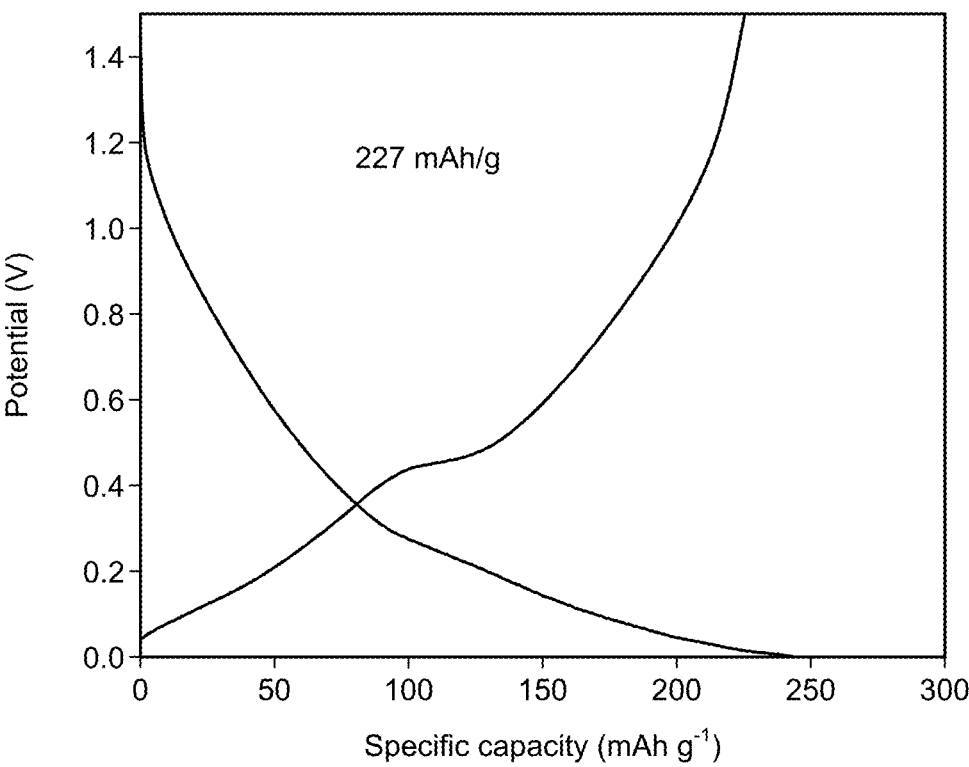
FIG. 31 is a drawing to illustrate a charge-discharge characteristic of a battery (half cell) having the negative electrode using the negative electrode material of Example.

Next, the charge-discharge characteristics of the batteries (half cell) having the negative electrodes using the negative electrode materials of Examples and Comparative Examples will be described. FIGS. 31 through 34 illustrate the charge-discharge characteristics at 0.2 C of the negative electrodes using the negative electrode materials of Examples and Comparative Examples. FIG. 31 illustrates the charge-discharge characteristics of the battery (half cell) having the negative electrode using the negative electrode material of Example. As can be seen in FIG. 31, in Example 1, it is confirmed that the battery is properly charged and discharged. It can be seen that Example 1 tends to have a higher capacity than Comparative Example 2.

Figure 32:
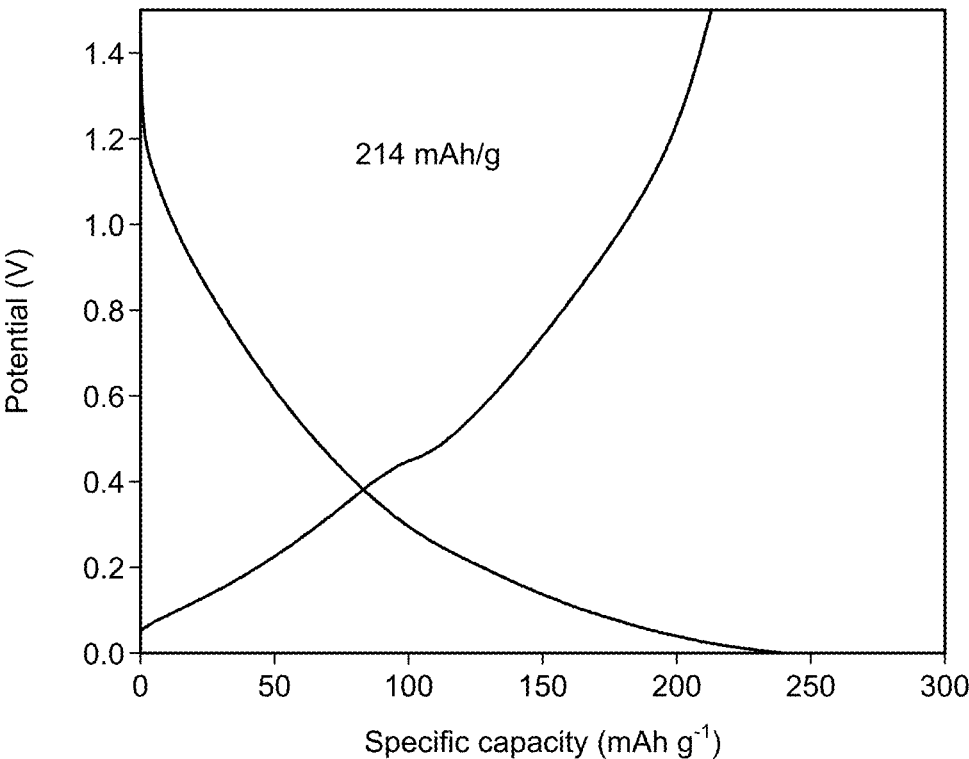
FIG. 32 is a drawing to illustrate the charge-discharge characteristic of the battery (half cell) having the negative electrode using the negative electrode material of Example.

FIG. 32 illustrates the charge-discharge characteristics of the battery (half cell) having the negative electrode using the negative electrode material in the Example. As can be seen in FIG. 32, in Example 2, it is confirmed that the battery is properly charged and discharged. It can be seen that Example 2 tends to have a higher capacity than Comparative Example 2.

Figure 33:
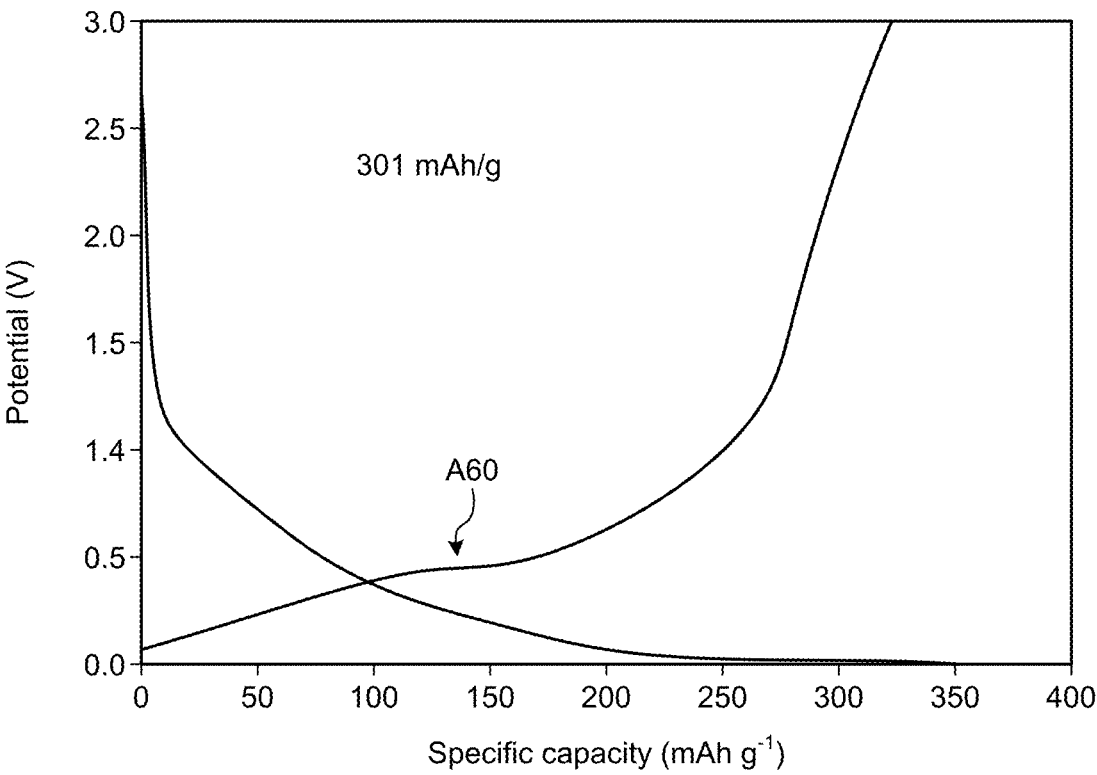
FIG. 33 is a drawing to illustrate the charge-discharge characteristic of the battery (half cell) having the negative electrode using the negative electrode material of Comparative Example.

FIG. 33 is the drawing to illustrate the charge-discharge characteristics of the battery (half cell) having the negative electrode using the negative electrode material of Comparative Example. As can be seen in FIG. 33, in Comparative Example 1, during discharging, the voltage decreases rapidly to about 1.3 V with the start of discharge, and then decreases slowly. In Comparative Example 1, as indicated by Arrow A60, it can be seen that during charging, when the voltage reaches about 0.5 V, the increase in voltage tends to stagnate until the capacity increases to about 170 mAh/g.

Figure 34:
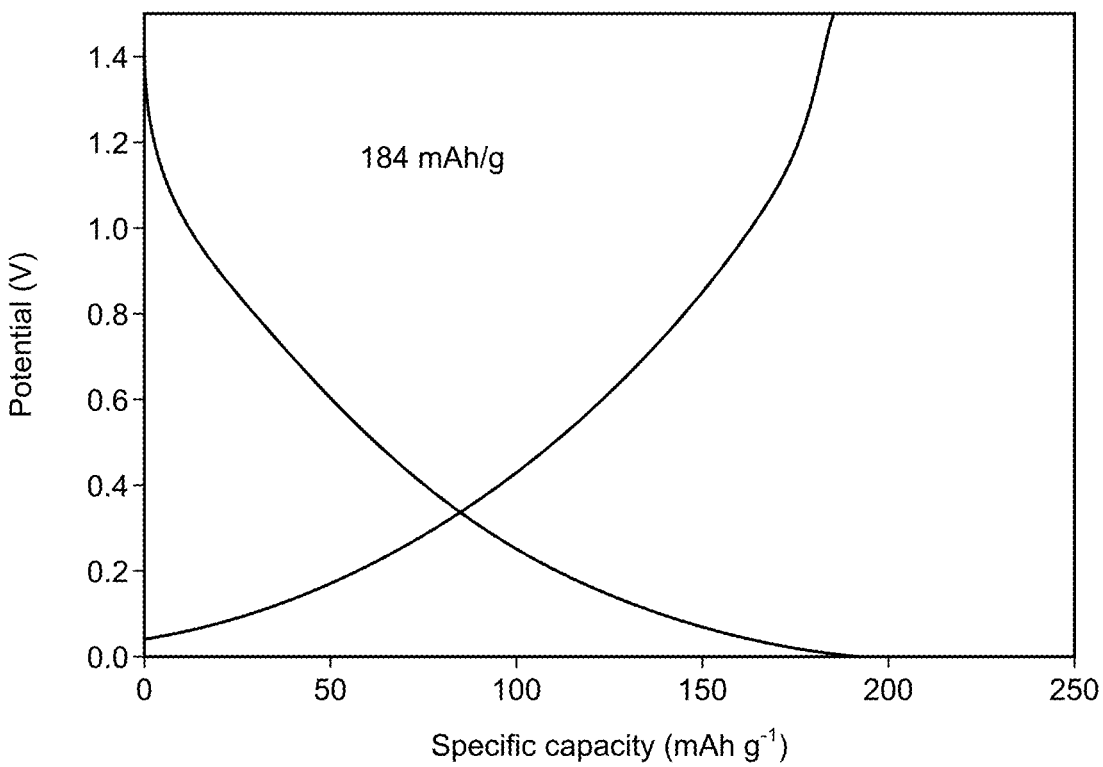
FIG. 34 is a drawing to illustrate the charge-discharge characteristic of the battery (half cell) having the negative electrode using the negative electrode material of Comparative Example.

FIG. 34 is a drawing to illustrate the charge-discharge characteristics of the battery (half cell) having the negative electrode using the negative electrode material of Comparative Example. As can be seen in FIG. 34, in Comparative Example 2, it is confirmed that the battery is properly charged and discharged.

Figure 35:
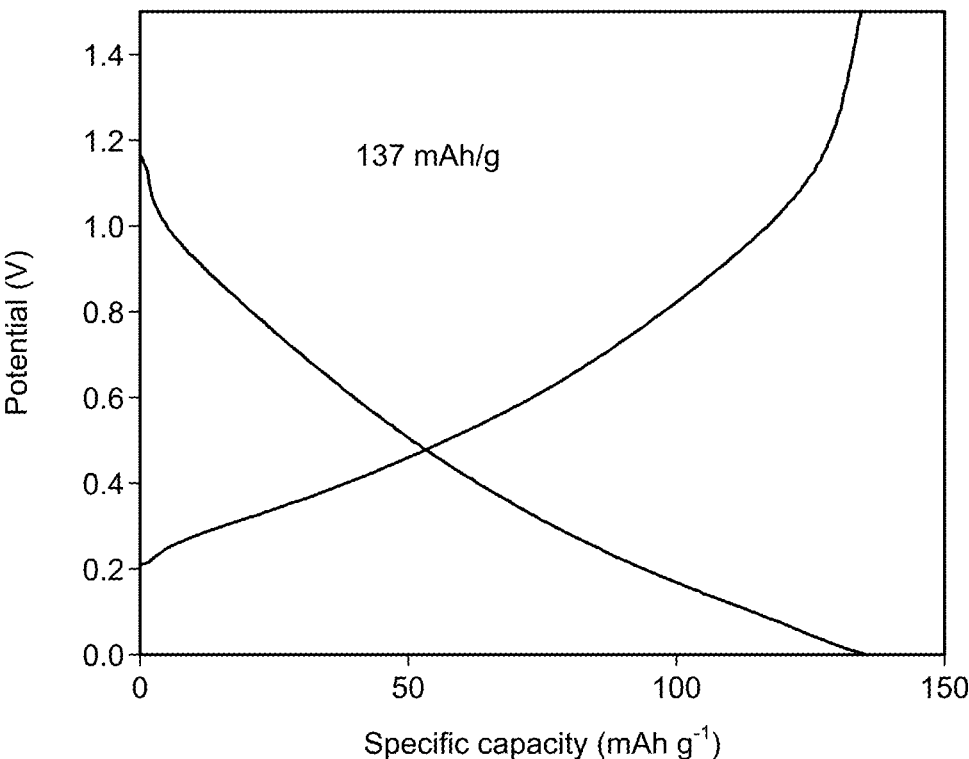
FIG. 35 is a drawing to illustrate the charge-discharge characteristic of the battery (half cell) having the negative electrode using the negative electrode material of Example.

Next, the charge-discharge characteristics of the batteries (half cell) having the negative electrodes using the negative electrode materials of Examples and Comparative Examples will be described. In the following, the results of HC measurements are described as Comparative Example 3. FIGS. 35 through 39 illustrate the charge-discharge characteristics at 3.2 C of the negative electrodes using the negative electrode materials of Examples and Comparative Examples. The charge rate of 3.2 C corresponds to a high-speed charging. FIG. 35 illustrates the charge-discharge characteristics of the battery (half cell) having the negative electrode using the negative electrode material of Example. As can be seen in FIG. 35, in Example 1, it is confirmed that the battery is properly charged and discharged. It can be seen that Example 1 tends to have a higher capacity than Comparative Examples.

Figure 36:
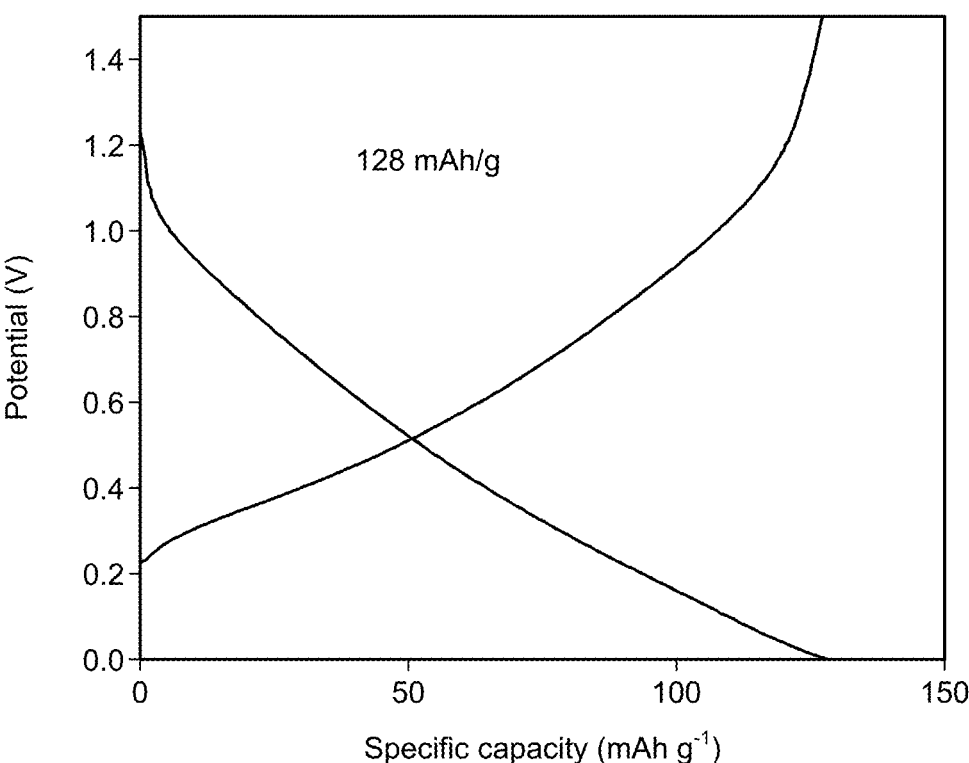
FIG. 36 is a drawing to illustrate the charge-discharge characteristic of the battery (half cell) having the negative electrode using the negative electrode material of Example.

FIG. 36 illustrates the charge-discharge characteristics of the battery (half cell) having the negative electrode using the negative electrode material of Example. As can be seen in FIG. 36, in Example 2, it is confirmed that the battery is properly charged and discharged. It can be seen that Example 2 tends to have a higher capacity than Comparative Example.

Figure 37:
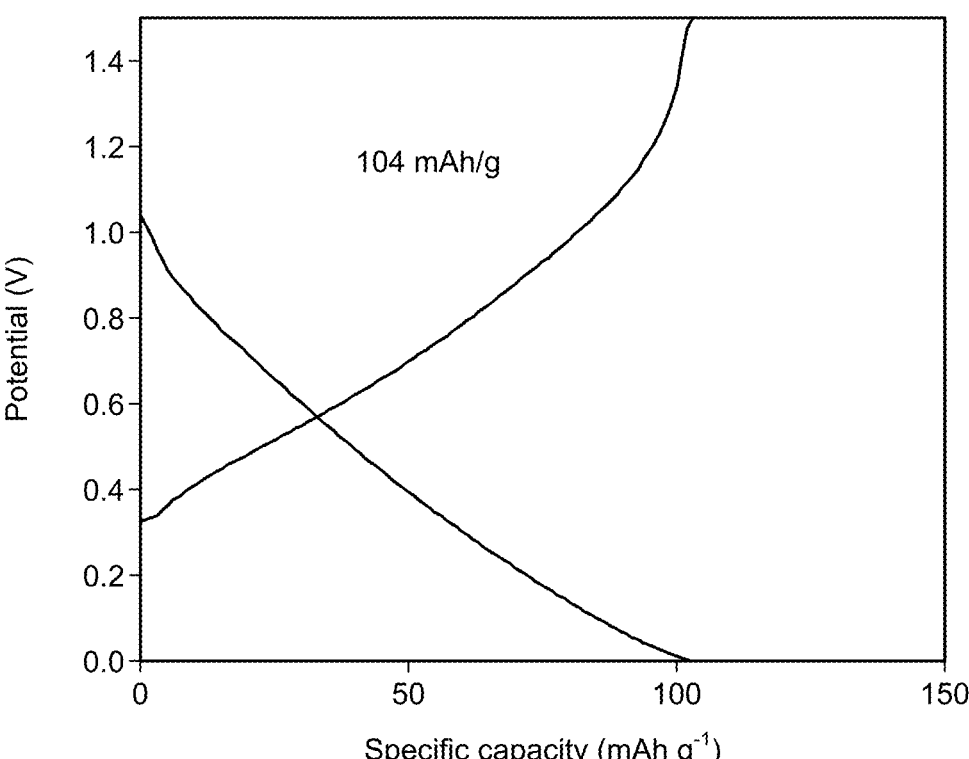
FIG. 37 is a drawing to illustrate the charge-discharge characteristic of the battery (half cell) having the negative electrode using the negative electrode material of Comparative Example.

FIG. 37 is the drawing to illustrate the charge-discharge characteristics of the battery (half cell) having the negative electrode using the negative electrode material of Comparative Example. As can be seen in FIG. 37, in Comparative Example 1, the voltage at the start of discharge is lower than in Examples. In Comparative Example 1, it can be seen that the capacity tends to be lower than in Examples. In addition, in Comparative Example 1, the decrease in the charge-discharge characteristics at 3.2 C is more than in the charge-discharge characteristics at 0.2 C. Comparative Example 1 has almost the same charge-discharge characteristics as Comparative Example 3.

Figure 38:
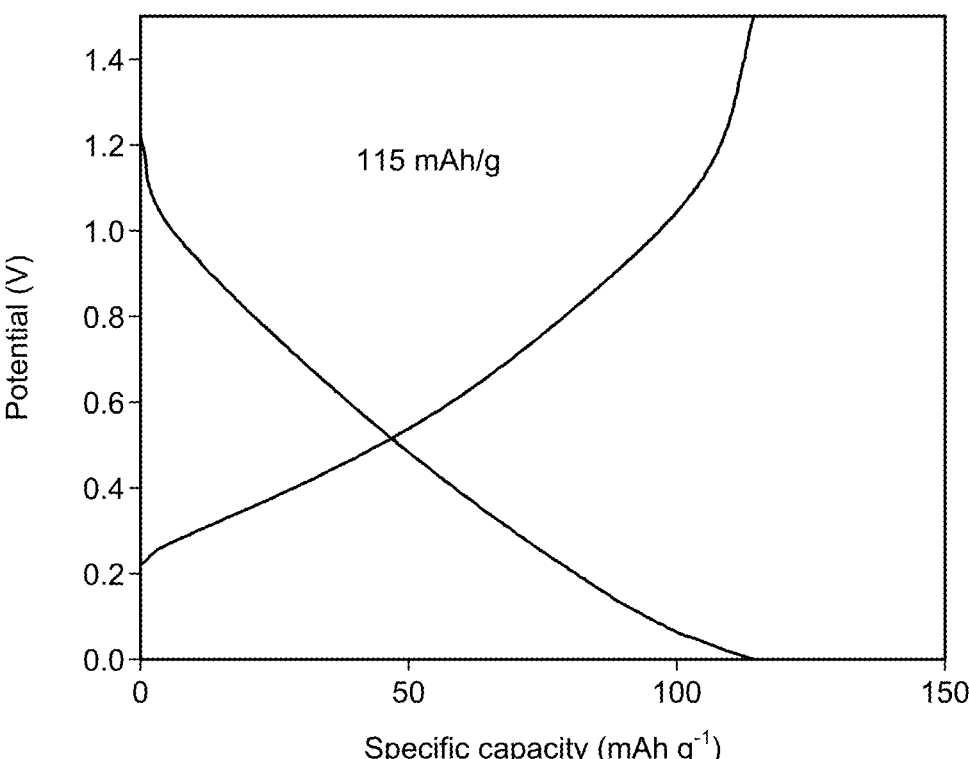
FIG. 38 is a drawing to illustrate the charge-discharge characteristic of the battery (half cell) having the negative electrode using the negative electrode material of Comparative Example.

FIG. 38 is the drawing to illustrate the charge-discharge characteristics of the battery (half cell) having the negative electrode using the negative electrode material of Comparative Example. It can be seen from FIG. 38 that in Comparative Example 2, the capacity tends to be lower than in the Example.

Figure 39:
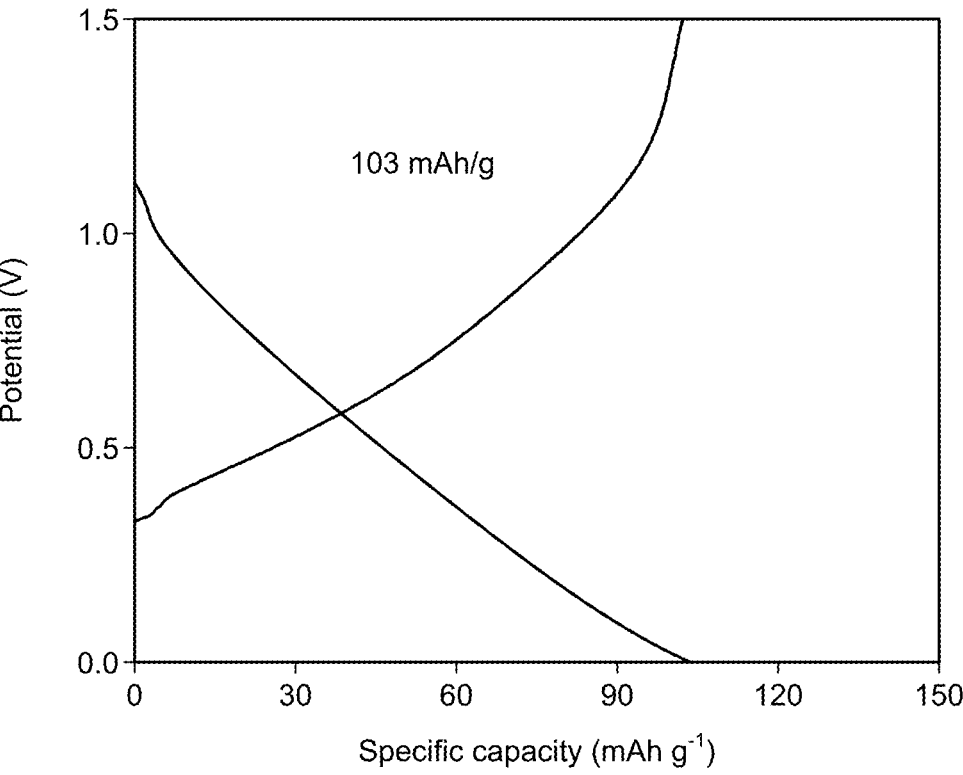
FIG. 39 is a drawing to illustrate the charge-discharge characteristic of the battery (half cell) having the negative electrode using the negative electrode material of Comparative Example.

FIG. 39 is the drawing to illustrate the charge-discharge characteristics of the battery (half cell) having the negative electrode using the negative electrode material of Comparative Example. As can be seen in FIG. 39, in Comparative Example 3, the voltage at the start of discharge is lower than in Examples. In Comparative Example 3, it can be seen that the capacity tends to be lower than in Examples and other Comparative Examples.

The order of the charge-discharge characteristics of batteries (half cell) having the negative electrodes using the negative electrode materials of Examples and Comparative Examples from higher to lower is: Example 1, Example 2, Comparative Example 2, and Comparative Example 1.

The embodiments of the present invention have been described above, but the embodiment is not limited by the contents of these embodiments. In addition, the composition elements described above also include those that can be readily conceived by a person ordinarily skilled in the art, those that are substantially identical, and those that are in the so-called equivalent range. In addition, the composition elements described above can be combined as appropriate. In addition, various omissions, substitutions, or modifications of the composition elements can be made as long as these do not deviate from the gist of the embodiments described above.

REFERENCE SIGNS LIST

1 Battery
14 Negative electrode
22 Negative electrode material layer
30 Carbon particle
32 WO$_3$ particle
33 Silicon particle

The invention claimed is:

1. A negative electrode material for a battery, the negative electrode material comprising:
 carbon;
 tungsten trioxide formed on a surface of the carbon; and
 silicon formed on the surface of the carbon,
 wherein based on 100% by weight as a total content of the carbon, the tungsten trioxide, and the silicon, a ratio of a content of the silicon to a content of the tungsten trioxide is in a range of 0.2 or more to 2.5 or less.

2. The negative electrode material according to claim 1, wherein the carbon, the tungsten trioxide, and the silicon are composited.

3. The negative electrode material according to claim 1, wherein the carbon is composited with the tungsten trioxide, and the carbon is composited with the silicon.

4. The negative electrode material according to claim 1, wherein the carbon is an amorphous carbon or a graphite.

5. The negative electrode material according to claim 1, wherein the negative electrode material comprises the tungsten trioxide having a hexagonal crystal structure.

6. The negative electrode material according to claim 1, wherein the negative electrode material comprises the tungsten trioxide having a hexagonal crystal structure and an orthorhombic crystal structure.

7. The negative electrode material according to claim 1, wherein a ratio of an addition amount of the silicon to a total amount including an addition amount of the carbon, an addition amount of the tungsten trioxide, and an addition amount of the silicon is in a range of 1% or more by weight to 10% or less by weight.

8. The negative electrode material according to claim 1, wherein based on 100% by weight as a total content of the carbon, the tungsten trioxide, and the silicon, a content of the silicon is in a range of 1% or more by weight to 10% or less by weight.

9. A battery comprising:
 the negative electrode material according to claim 1; and
 a positive electrode material.

* * * * *